(12) United States Patent
Davis

(10) Patent No.: US 10,510,077 B2
(45) Date of Patent: Dec. 17, 2019

(54) FACIAL RECOGNITION IDENTIFICATION FOR IN-STORE PAYMENT TRANSACTIONS

(71) Applicant: Facebook, Inc., Menlo Park, CA (US)

(72) Inventor: Stephen Moore Davis, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 537 days.

(21) Appl. No.: 15/145,590

(22) Filed: May 3, 2016

(65) Prior Publication Data

US 2017/0323299 A1    Nov. 9, 2017

(51) Int. Cl.
    *G06Q 20/20* (2012.01)
    *G06Q 20/40* (2012.01)
    *G06Q 20/32* (2012.01)

(52) U.S. Cl.
    CPC ..... *G06Q 20/40145* (2013.01); *G06Q 20/204* (2013.01); *G06Q 20/3224* (2013.01)

(58) Field of Classification Search
    None
    See application file for complete search history.

(56) References Cited

U.S. PATENT DOCUMENTS

| 9,519,901 | B1 * | 12/2016 | Dorogusker | G06Q 20/401 |
| 9,619,803 | B2 * | 4/2017 | Chandrasekaran | G06K 9/00255 |
| 2011/0211764 | A1 * | 9/2011 | Krupka | G06F 17/30247 382/225 |
| 2015/0348045 | A1 * | 12/2015 | Agarwal | G06K 9/00248 705/44 |

* cited by examiner

*Primary Examiner* — Paul Danneman
(74) *Attorney, Agent, or Firm* — Keller Jolley Preece

(57) ABSTRACT

The present disclosure relates to systems, methods, and devices for facial recognition identification for in-store payment transactions. In particular, a payment system allows a user to engage in a payment transaction with a merchant to purchase goods or services at an in-store checkout location. For example, one or more implementations involve receiving a payment request to initiate an in-store payment transaction between a user and a merchant, the payment request including an image of the user. One or more embodiments identify a payment account for the user based on the image and send a payment confirmation request to a client device of the user. Additionally, one or more embodiments process the in-store payment transaction based on a confirmation response received from the client device.

20 Claims, 13 Drawing Sheets

FACIAL RECOGNITION IDENTIFICATION FOR IN-STORE PAYMENT TRANSACTIONS

BACKGROUND

1. Technical Field

One or more embodiments described herein relate generally to systems and methods for user identification for electronic payments. More specifically, one or more embodiments relate to systems and methods of enabling consumer identification for processing in-store electronic payment transactions.

2. Background and Relevant Art

When purchasing goods at a brick-and-mortar store, rather than via an online store, consumers can pay in a variety of methods. Specifically, consumers can pay for goods or services at a variety of stores using cash, physical credit/debit card, or electronically with near field communication. For example, conventional electronic payment systems allow users to perform electronic payment transactions with a merchant (i.e., peer-to-business payment transactions); however, many conventional electronic payment systems lack a secure and/or convenient method determining the identification of the user during the transaction process.

Some conventional electronic payment systems use near field communication (NFC) protocols to process electronic payment transactions between a consumer and a merchant. Specifically, NFC protocols allow a consumer to place the consumer's mobile device (e.g., smartphone) near a checkout terminal configured to initiate a payment transaction via NFC protocols. Although NFC mobile devices and NFC-compliant checkout terminals are becoming more prevalent and provide security for electronic payment transactions, NFC protocols typically require consumers to place their mobile devices very close to a specific location on of a checkout terminal. Additionally, NFC protocols often require a consumer to enter a PIN, password, or biometric scan to unlock the mobile device and process NFC payment transactions.

Other conventional electronic payment systems allow consumers to enter into payment transactions using payment information that users have previously tied to a specific application. For example, some conventional electronic payment systems allow a consumer to install an application that stores payment credentials associated with a user's payment account. When the consumer wants to purchase goods or services from a participating merchant, the consumer navigates to and opens the application on the consumer's mobile device to access and/or provide authorization for an electronic payment transaction. These systems require the consumer to unlock his or her mobile device and find and open the correct application, and in addition provide a password or pin to complete a transaction.

As mentioned, although conventional electronic payment systems allow consumers to engage in payment transactions with merchants, conventional systems are often inconvenient and introduce unnecessary and cumbersome steps to process an electronic payment transaction between a consumer and a merchant. In particular, requiring consumers to place a mobile device near a small and very specific location, or requiring consumers to find and open a specific application prior to initiating a payment transaction can often cause the payment transaction process be as slow, and in many cases, less convenient slower than conventional cash-based or card-based transactions.

Accordingly, there are a number of disadvantages with conventional electronic payment systems and methods.

SUMMARY

One or more embodiments described herein provide benefits and/or solve one or more of the foregoing or other problems in the art with systems and methods to allow users to easily and efficiently engage in secure in-store electronic payment transactions with merchants. In particular, the systems and methods enable face-based electronic payment identification. One or more example embodiments identify a payment account for a user based on an image of the user associated with a payment request from a merchant client device. Example systems and methods obtain an image of the user captured at an in-store checkout location when the user attempts to pay for goods or services from the merchant. Additionally, one or more embodiments use facial recognition to identify the payment account for the user from a user profile database. Thus, the systems and methods can use a captured image of the user from the merchant to verify the identity of the user, as well as to identify a payment account for use in processing a payment transaction between the user and the merchant.

One or more embodiments of the systems and methods also authenticate the payment transaction by receiving a confirmation from the user. Specifically, in one or more examples, the systems and methods send a payment confirmation request to a client device associated with the payment account for the user. Upon receiving the payment confirmation request, the client device can detect, based on a user interaction with the client device, that the user confirms the payment request, and in response, send a confirmation response. After receiving a confirmation response, one or more embodiments process the payment transaction between the merchant and the user.

Accordingly, example embodiments described herein provide a true two-factor authentication process that increases the security of the payment transaction. First, the facial recognition to identify a user is a first factor to authenticates the user. Second, the confirmation request sent to the mobile device corresponding to the identified user serves as a second factor to authenticate the user. By using true two-factor authenticating based on a facial detection of a user at an in-store merchant location and confirming the payment via the user's client device, the systems and methods can provide a secure payment transaction while also providing increased efficiency and convenience.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 3A-3F illustrate example graphical user interfaces for initiating a payment transaction in accordance with one or more embodiments;

DETAILED DESCRIPTION

Figure 1:
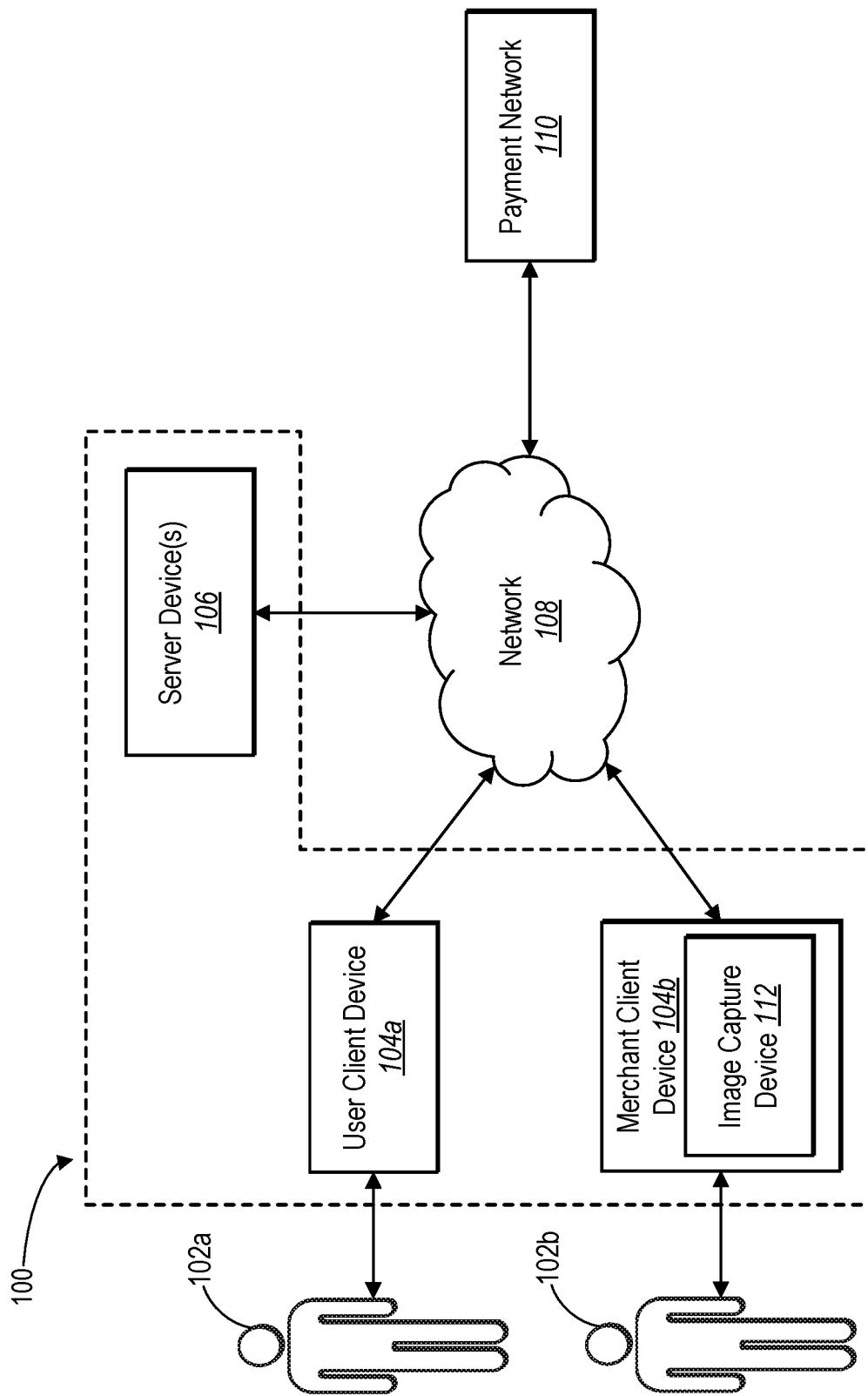
FIG. 1 illustrates a schematic diagram of an environment in which a payment system operates in accordance with one or more embodiments.

Embodiments of the present disclosure provide a payment system that allows users to engage in payment transactions with merchants. In particular, one or more embodiments provide a payment system for users to purchase goods or services at in-store checkout locations using electronic payments. For example, the payment system identifies a user at an in-store checkout location using facial recognition technology. In one or more embodiments, for example, the payment system captures an image of a user at a checkout location and matches the captured image with a stored image of the user corresponding to a user account. Based on identifying the user and accessing information within the user profile, the payment system requests authorization from the user by sending a notification to the user's mobile device. By using facial recognition to identify users during checkout and sending notifications to the users' mobile devices to request authorization, the payment system allows users to engage in easy, quick, and secure in-store payment transactions with merchants.

As mentioned, the payment system allows users to initiate electronic payment transactions with merchants. Specifically, the payment system receives a payment request to initiate a payment transaction between a user and a merchant from a merchant client device. For example, the merchant client device can capture an image of the user using an image capture device and send the image of the user to the payment system. The payment system uses facial recognition processes to identify the user from a plurality of users based on the image of the user.

One or more embodiments of the payment system use location information to reduce the number of images analyzed during the facial recognition process. In particular, the payment system identifies a location of the merchant and then identifies users at the merchant's location based on GPS data sent from each user's mobile device. The payment system can then compare the received image of the user to images of the users at the merchant's location (e.g., images associated with corresponding user accounts). By comparing the image of the user to only images of users at the merchant's location, the payment system narrows the list of possible matches and largely reduces processing time and increases the speed at which the payment system can identify the user.

In one or more embodiments, the payment system also provides information to a merchant (e.g., an employee) at the in-store checkout location for verification of the user's identity. For instance, to verify the identity of the user from a plurality of possible users at the merchant's location, the payment system can send a plurality of images of selected users to the merchant client device. For example, the payment system can select images corresponding to the user accounts of the selected users to send to the merchant client device. The merchant can then select the image that depicts the user at the checkout location, and the merchant client device can send a response to the payment system verifying the identity of the user paying for the goods or services.

Once the payment system identifies the user, the payment system identifies a payment account for the user. For example, the payment system accesses a user account for the user and identifies a payment account. To illustrate, the payment system can identify a payment account that the user previously registered and stored in the user account. Thus, the payment system can identify the payment account for the user without requiring the user to perform any additional actions, such as opening an application on a mobile device and selecting a payment account.

As briefly mentioned above, in one or more embodiments, the payment system also sends a notification to a client device of the user to request authorization for the payment transaction. Specifically, the payment system identifies a client device associated with the user account corresponding to the user. For example, the user associates one or more client devices with the user account that are authorized to initiate and approve payment transactions (e.g., a smart phone). To illustrate, the payment system can determine one or more client devices associated with the user account by identifying client devices from which the user has logged into the user account via an authorized application.

The payment system can then send a notification to request confirmation and authorization of the payment transaction between the user and the merchant. For example, the payment system can send a push notification to the client device of the user to notify the user of the payment transaction. To confirm and authorize the payment transaction, one or more embodiments allow the user to interact with the notification on a lock screen or in a notification tray without requiring the user to open a specific application.

When the payment system receives a confirmation response from the user's client device, the payment system initiates the payment transaction. Specifically, the payment system initiates the payment transaction by sending a payment token representing the user's payment account information to the merchant client device. The merchant client device can then send the payment token to a payment network to process the payment transaction between the user and the merchant. Alternatively, the payment system initiates the payment transaction by sending the payment token directly to the payment network, bypassing the merchant client device. By using a tokenized version of the payment account information, the payment system can allow the user to engage in payment transactions with the merchant without sending the user's actual payment account information to the merchant.

Because the payment system uses both facial recognition identification and user authorization via the user's client device, the payment system can provide a fast and secure payment transaction process. For example, even if the user loses his or her mobile device, someone else recovering the mobile device would be unable to use the mobile device to enter into in-store electronic payment transactions because the payment system would not match the face of the person recovering the mobile device to the user's face. Additionally, the authentication step allows the payment system to require that the user provide explicit approval prior to processing a payment transaction. Specifically, the authentication step prevents other users from entering into payment transactions even if the other users were able to fool the payment into identifying the user when the user is not present.

FIG. 1 is a schematic diagram illustrating an environment that includes a payment system 100 in accordance with one or more embodiments. An overview of the environment is described in relation to FIG. 1. Thereafter, a more detailed description of the components and processes of the payment system 100 and other components within the environment are provided in relation to the remaining figures.

As illustrated by FIG. 1, the payment system 100 allows users to engage in electronic payment transactions with merchants. Specifically, the payment system 100 allows a user 102a to engage in an in-store electronic payment transaction with a merchant 102b using a user client device 104a and a merchant client device 104b, respectively. As further illustrated in FIG. 1, and as described in more detail in additional figures, the payment system 100 allows the merchant client device 104b associated with the merchant to communicate with server device(s) 106 via a network 108. The server device(s) 106 are also able to communicate with the user client device 104a associated with the user via the network. In addition, the payment system 100 can include a payment network 110 communicatively coupled with the server device(s) 106 via the network 108. Although FIG. 1 illustrates a particular arrangement of the user client device 104a, the merchant client device 104b, the server device(s) 106, the network 108, and the payment network 110, various additional arrangements are possible. For example, the user client device 140a and/or the merchant client device 104b may directly communicate with the server device(s) 106, bypassing the network 108. In another example, the server device(s) 106 may include the payment network 110, such that the payment system 100 processes payment transactions at the server device(s) 106.

The payment system 100 coordinates the sending and receiving of payments between the user 102a and the merchant 102b in connection with a payment transaction. For example, the user 102a can begin a checkout process by selecting one or more goods or services to purchase at an in-store checkout location. The in-store checkout location can include a checkout terminal or other checkout location (e.g., a POS terminal/device) that allows the user to purchase goods or services in a physical store. According to various embodiments, the checkout location can allow the user to interact with the merchant 102b to purchase goods or services or can allow the user 102a to perform a self-checkout process to purchase goods or services.

As briefly mentioned above, FIG. 1 shows that the user 102a and the merchant 102b can use a user client device 104a and a merchant client device 104b, respectively, to engage in electronic payment transactions with one another via the server device(s) 106 and the payment network 110. For example, the merchant 102b, using the merchant client device 104b can exchange payment transaction information (e.g., images, user/merchant identifiers, payment amounts, payment account information) with the server device(s) 106 in one or more electronic communications. To illustrate, the merchant client device 104b can include an image capture device 112 to obtain an image of the user and send the image to the server device(s) 106. The server device(s) identifies the user 102a based on the received image and determines a payment account for the user 102a to use in processing the payment transaction.

In one or more embodiments, the image capture device 112 can include a device for capturing digital images of users purchasing goods or services at in-store checkout locations. For example, the image capture device 112 can include a digital camera for capturing digital video or digital images of users at an in-store checkout location. The merchant client device 104b can send a captured image of a user to the server device(s) 106 for identifying the users. Alternatively, one or more embodiments of the merchant client device 104b is able to process the captured images for identifying users without sending image data to the server device(s) 106.

Additionally, the user 102a, using the user client device 104a, can exchange one or more electronic communications with the server device(s) 106 to confirm and authorize one or more payment transactions. For example, the server device(s) 106 can send payment transaction data to the user client device 104a after identifying the user 102a and determining the payment account. The user 102a can authorize the payment transaction by interacting with the user client device 104a to cause the user client device 104a to send an authorization response message to the server device(s) 106. The server device(s) 106 can then process the payment transaction between the user 102a and the merchant 102b based on the user's authorization. Specifically, the server device(s) 106 communicate with the payment network 110 to transfer funds from a payment account of the user 102a to a payment receivable account of the merchant 102b.

Based on a various embodiments of the payment system 100, the server device(s) 106 store various types of information associated with users and merchants. Specifically, the server device(s) 106 store identifier information for use in identifying the user 102a and the merchant 102b in a payment transaction. For example, in one or more embodiments, the server device(s) 106 can include or communicate with a social networking system that stores user information for users registered with the social networking system. To illustrate, the social networking system can maintain user accounts including user identification information, photos that users have uploaded, and payment account information. The server device(s) 106 can use any of the user information to identify the user 102a and to initiate a payment transaction between the user 102a and a merchant 102b. In one or more embodiments, the social networking system also allows merchants to establish user/merchant accounts for engaging with other users.

In addition to allowing the user 102a and the merchant 102b to engage in electronic payment transactions, the payment system 100 can allow users and/or merchants to exchange messages with other users. For example, client applications on the user client device 104a and the merchant client device 104b allow the user 102a and merchant 102b to exchange communications with each other. To illustrate, the user client device 104a and merchant client device 104b sends and receives communication messages (e.g., text messages, instant messages) via the server device(s) 106.

Figure 6:
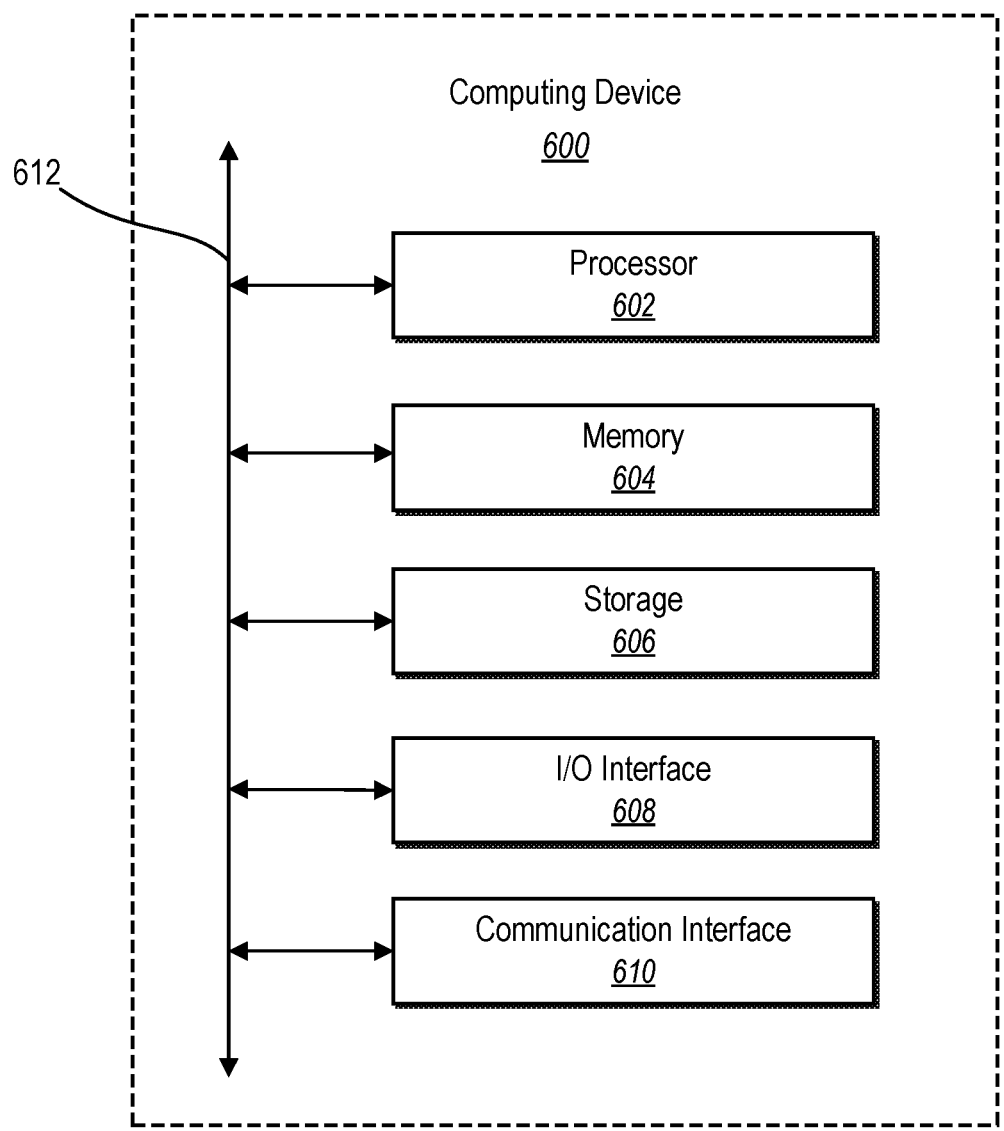
FIG. 6 illustrates a block diagram of an example computing device in accordance with one or more embodiments.

As mentioned previously, and as FIG. 1 illustrates, the user 102a and merchant 102b can interact with the user client device 104a and the merchant client device 104b, respectively. Examples of client devices include computing devices such as mobile devices (e.g., smartphones, tables), laptops, desktops, or any other type of computing device. FIG. 6 and the corresponding description provide additional information regarding computing devices. Moreover, and as mentioned above, the user client device 104a and the merchant client device 104b can communicate with the server device(s) 106 and/or with each other through the network 108. In one or more embodiments, the network 108 includes the Internet or World Wide Web. The network 108, however, can include one or more private and/or public networks that use various communication technologies and protocols, as further described below with reference to FIG. 7.

Figure 2A:
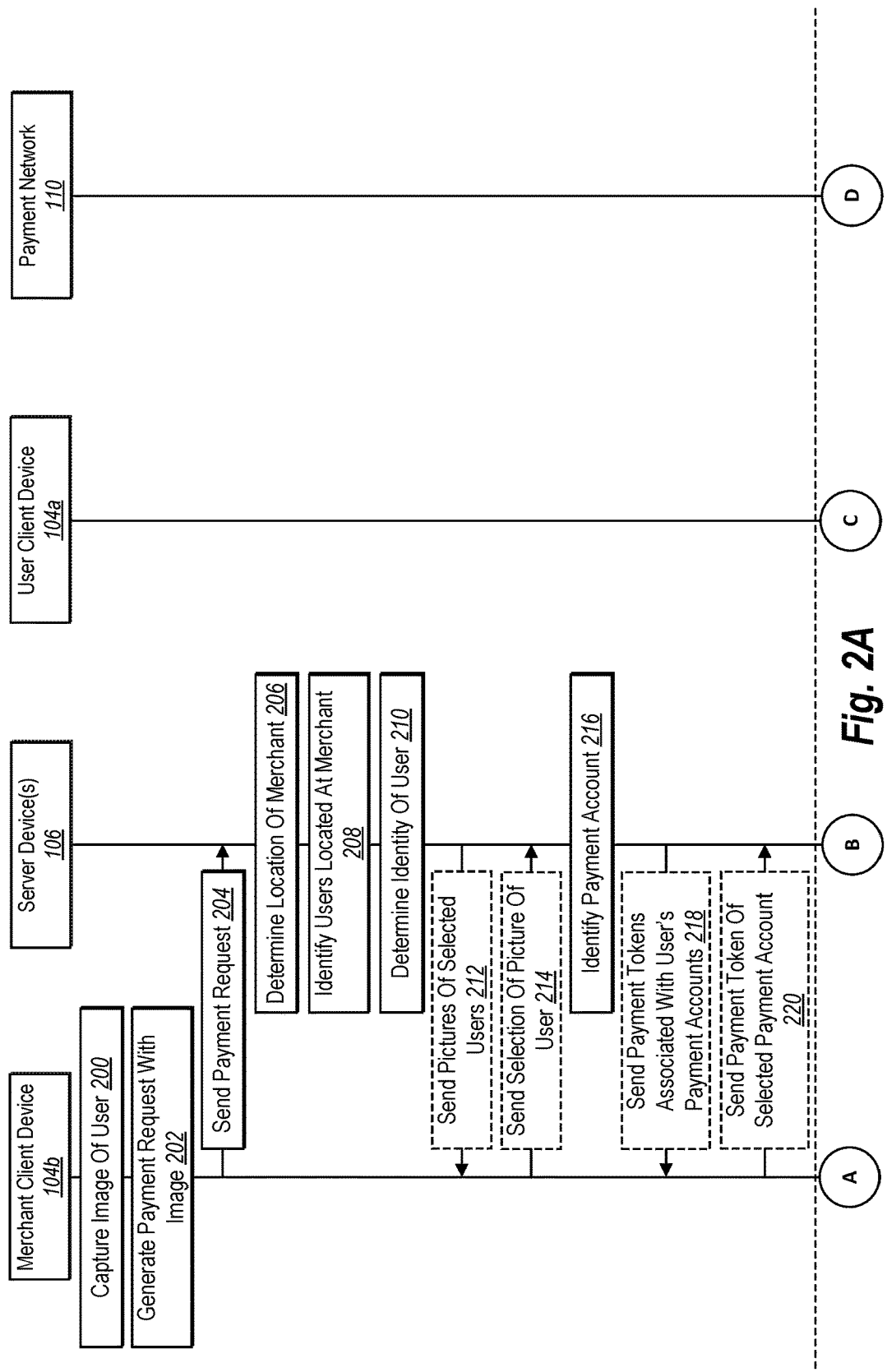
FIGS. 2A-2B illustrate a sequence-flow diagram illustrating interactions as part of a payment process between a user and a merchant in accordance with one or more embodiments.
Figure 2B:
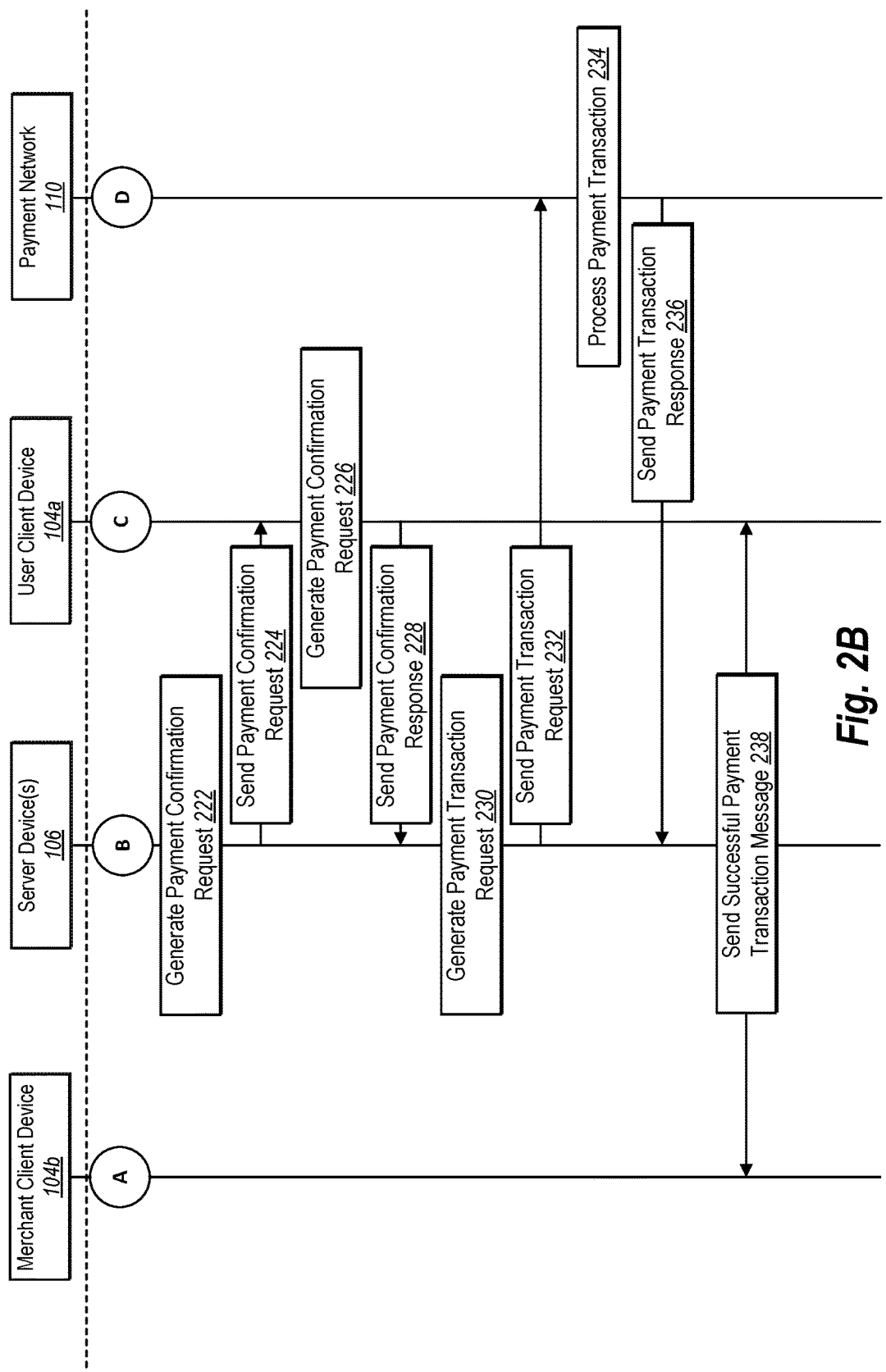

As discussed, the systems and components explained above with reference to FIG. 1 allow users (e.g., consumers) to easily, efficiently, and securely engage in in-store electronic payment transactions with merchants via a payment system 100. FIGS. 2A-2B illustrate example process diagrams of one or more example embodiments of processes implemented by the payment system 100 discussed above. Consistent with payment system 100 illustrated in FIG. 1, FIGS. 2A-2B illustrate (according to a sequence flow of operations) a user client device 104a, a merchant client device 104b, server device(s) 106, and a payment network 110.

In one or more embodiments, a process for a user engaging in a payment transaction with a merchant begins with the merchant client device 104b capturing 200 an image of a user. Specifically, FIG. 2A illustrates that the merchant client device 104b captures an image of a user purchasing goods or services from the merchant. For example, as previously mentioned, the merchant client device 104b can include an image capture device that is part of, or in communication with, the merchant client device 104b. In one or more embodiments, the image capture device captures continuous video of the user near the checkout location. The merchant client device 104b can then isolate frames of the captured video for use in identifying the user.

The merchant client device 104b also generates 202 a payment request for initiating a payment transaction between the user and the merchant in connection with the user purchasing goods or services from the merchant. In particular, the merchant client device 104b generates a payment request that includes the image of the user. In one or more embodiments, the merchant client device 104b generates the payment request after determining a total payment amount related to the purchase of goods or services. The payment request can also include additional payment transaction information for initiating the payment transaction, such as a merchant identifier and a payment amount.

In at least some instances, the merchant client device 104b can generate the payment request with the image of the user prior to determining a total amount of the payment transaction. For example, the merchant client device 104b can obtain an image of the user when the user enters a field of view of the image capture device at any time while the user is attempting to purchase goods or services from the merchant. For instance, the merchant client device 104b can capture an image of the user when the user first approaches the checkout location to being purchasing goods or services. Thus, the merchant client device 104b may generate an initial payment request that does not include the payment amount for the payment transaction because a total payment amount may not be available at that time. After generating the payment request, the merchant client device 104b sends 204 the payment request to the server device(s) 106.

In one or more embodiments, the server device(s) 106 receive the payment request from the merchant client device 104b and use the payment request to determine 206 a location of the merchant. Specifically, the server device(s) 106 determine the location of the merchant based on merchant location information or a merchant identifier in the payment request. For example, the payment request can include location data that the merchant client device inserts into the payment request to indicate a physical location of the merchant. Alternatively, the payment request can include a merchant identifier that allows the server device(s) 106 to identify a particular merchant store (e.g., identify a specific store from a plurality of stores associated with the merchant) and a physical location of the particular merchant store.

The server device(s) 106 can use the location of the merchant to identify 208 users that are located within a defined proximity of the location of the merchant store. In particular, the server device(s) 106 use the location of the merchant to identify users who are at or near the location of the merchant. For example, the server device(s) 106 can obtain location data from user devices of users registered with a social networking system (or other system that stores user accounts). The server device(s) use the obtained location data from client devices of users who have previously registered with the social networking system. The server device(s) 106 then compare the obtained location data to the location of the merchant to determine that one or more users are at or near the location of the merchant. Alternatively, the server device(s) use device connection information from a plurality of wireless device (e.g. Bluetooth devices or wireless network devices) to determine that one or more users are at or near the location of the merchant.

Identifying registered users at or near the location of the merchant narrows the number of candidates from which the server device(s) 106 can identify the user. Specifically, the server device(s) 106 determine 210 the identity of the user by comparing the image of the user in the payment request to images of users stored at the server device(s) 106. By narrowing the number of candidates to the users located at or near the location of the merchant, rather than comparing the image of the user to images of all users stored at the server device(s) 106 (or to the general geographic location of the user), the server device(s) 106 significantly reduce the amount of processing time to find a matching user. In particular, comparing the image of the user in the payment request to images of only a few users is more efficient than comparing the image of the user in the payment request to images of a potentially large number of users.

In one or more additional embodiments, the server device(s) 106 can use other narrowing factors or degrees of narrowing. For example, if location data from user client devices is unreliable for determining exact locations of users at the location of the merchant (e.g., in a merchant store), the server device(s) 106 can establish predefined geo-fences for identifying users who are approximately at the location of the merchant. To illustrate, the server device(s) 106 can establish a ¼-mile radius centered at the location of the merchant to identify users who are at or near the location of the merchant. Alternatively, the server device(s) 106 can establish geo-fences based on zip codes, cities, counties, or any other predefined geographical region.

In one or more embodiments, the server device(s) 106 use iterative geo-fencing steps to identify a user at the location of the merchant. In particular, the server device(s) 106 can identify a plurality of users within a first area based on the location of the merchant and compare the image of the user to images of users within the first area. If the server device(s) 106 do not find a match for the image of the user in the first area, the server device(s) 106 can expand the search area to a larger second area and compare the image of the user to images of additional users found within the second area. The server device(s) 106 can continue expanding the search area until the server device(s) 106 find a match for the image of the user.

When comparing the image received in the payment request to images stored at the server device(s) 106, the server device(s) 106 identify one or more user accounts associated with users located at the merchant's location. In particular, after identifying the users located at the merchant's location using location data from corresponding user devices (or within a defined geographic area surrounding the merchant location), the server device(s) 106 access user accounts of the identified users via the social networking system to obtain one or more images of the identified users. Based on the obtained images from the user accounts of the identified users, the server device(s) 106 can determine an identity of the user.

For example, the server device(s) 106 use one or more facial recognition techniques to identify the user from the received image in one or more other images of users. To illustrate, the server device(s) 106 can use image-processing techniques to determine whether the image received in the payment request contains a face that matches one or more faces in images associated with user accounts. For example, the server device(s) 106 uses facial recognition techniques that identify facial features from an image of a user based on the relative positions of the facial features. Based on the identified facial features of the user, the server device(s) 106 compares the face in the image received in the payment request to faces in images associated with user accounts of users located at the merchant's location. To illustrate, the server device(s) 106 can apply facial recognition techniques including hashing, principal component analysis, linear discriminate analysis, elastic bunch graph matching, hidden Markov models, multilinear subspace learning, or dynamic link matching. Alternatively, the server device(s) 106 can use 3-dimensional facial recognition techniques to compare 3-dimensional images of users.

Optionally, the server device(s) 106 can select one or more users located at the merchant's location and send 212 images of the selected users to the merchant client device 104b to allow the merchant to verify the identity of the user. For example, the server device(s) 106 can obtain images of the selected users from the corresponding user accounts to send to the merchant client device 104b. The images of the selected users may be profile images or other images that the selected users have previously uploaded to the server device(s) 106. In at least some instances, the server device(s) 106 can crop the images of the selected users so that only the faces of the selected users appear in the images that the server device(s) 106 send to the merchant client device 104b.

The server device(s) can use one or more methods to select which images of users to send to the merchant client device 104b to obtain user identification confirmation from the merchant. In one or more embodiments, the server device(s) 106 select users based on the image in the received payment request. In particular, the image in the payment request can include more than one user if a number of users are standing within a field of view of the image capture device of the merchant client device 104b. For example, if the image capture device captures more than one user at a checkout location (e.g., a plurality of users are standing close together), the payment request can include an image of the plurality of users. The server device(s) 106 can select users by identifying the users from the image and accessing corresponding user accounts to obtain an image of each user identified in the image. Sending images of selected users based on users identified in the image from the payment request allows the merchant to identify a paying user from a plurality of users near the checkout location.

In one or more alternative embodiments, the server device(s) 106 identify the user and then also select additional users for which to send images to the merchant randomly from the users located at the merchant's location. For example, the server device(s) 106 can determine that a plurality of users are located at the merchant's location and select the user and a predetermined number of additional users from the plurality of users. To illustrate, the server device(s) 106 can select the user and a predetermined number of additional users from the plurality of users to access the corresponding user profiles and obtain one or more images that the selected users previously stored on the server device(s) 106. The server device(s) 106 can then send an image of the user purchasing goods or services and images of the randomly selected additional users to the merchant client device 104b for the merchant to verify the identity of the user (e.g., disambiguate the user from other users at the merchant's location).

In one or more embodiments, the merchant verifies the identity of the user by selecting an image of the user on the merchant client device 104b. Specifically, the merchant can view a plurality of images of users displayed on a display of the merchant client device 104b. The merchant can determine that the user purchasing goods or services is in one of the plurality of images and select the corresponding image of the user by interacting with the display and/or an input device of the merchant client device 104b.

After the merchant verifies the identity of the user purchasing goods or services, the merchant client device 104b sends 214 an indication of the merchant selection of the user image to the server device(s) 106. For example, the merchant client device 104b can send the selected image to the server device(s) 106. Alternatively, the merchant client device 104b sends a user identifier associated with the selected image to the server device(s) 106. In any case, after receiving the indication of the merchant selection, the server device(s) 106 determine the identity of the user for initiating a payment transaction between the user and the merchant.

To initiate a payment transaction between the user and the merchant, the server device(s) 106 identifies 216 a payment account for the user. As mentioned previously, a user may have a payment account associated with a user account within a social networking system. If the user has a single payment account associated with the user account, the server device(s) 106 identify the payment account as the payment account associated with the user account without any additional input from the user or the merchant. Alternatively, if the user has a plurality of payment accounts associated with the user account (e.g., more than one credit/debit cards and/or gift cards), the user may select one of the plurality of payment accounts.

For instance, in the event that a user account is associated with a plurality of payment accounts, and a preferred payment account is not specified, the payment system identifies the payment account by requesting additional input from the merchant or the user. For example, the server device(s) 106 can optionally send 218 a plurality of payment tokens associated with payment accounts for the user to the merchant client device 104b. The payment tokens can be numerical values that do not expose payment credentials to the merchant. For example, the payment tokens can be numerical values that the payment network assigns to the user to represent the corresponding payment accounts and only allow access to the user's funds when authorized with the payment network. The payment tokens can have similar characteristics as the payment accounts so that the merchant associates the payment tokens with specific card networks or payment account issuers.

As described in more detail below, based on receiving the plurality of payment tokens, for example, the merchant client device 104b displays options to select a payment account from a plurality of payment accounts for the user. A merchant (or the user if at a self-checkout terminal) can select the corresponding payment account to use in the payment transaction. For example, the merchant can ask the user to verify which payment account the user would like to use in processing the payment transaction. After selecting a payment account, the merchant client device 104b sends 220 the payment token to the server device(s) 106 to use the corresponding payment account to process the payment transaction. Although the above embodiment describes using payment tokens, the payment system 100 can use other types of payment account identifiers, such as encrypted payment credentials, account names, account types, and/or other payment account information.

In one or more alternative embodiments, the server device(s) 106 identify the account after or in conjunction with receiving authorization from the user to process a payment transaction. For example, the server device(s) 106 can identify the payment account in response to the user selecting the payment account at the time of authorization. To illustrate, the server device(s) 106 sends a payment authorization notification to a mobile device associated with the user, where the payment authorization notification includes selectable options to allow the user to not only authorize the transaction, but also indicate the particular payment account to use for the transaction. For instance, the user can interact with a notification, described in more detail below, to open a digital wallet or application to select the payment account.

Once the server device(s) 106 have identified a payment account for the user, the server device(s) 106 generate 222 a payment confirmation request, as illustrated in FIG. 2B. Specifically, the server device(s) 106 request authorization from the user to initiate the payment transaction to prevent fraudulent payment transactions using the user's payment account. For example, the server device(s) 106 request authorization by generating the payment confirmation request to include a notification to the user that indicates payment transaction information such as the merchant and the payment amount. The server device(s) 106 then send 224 the payment confirmation request to the user client device 104a.

As previously mentioned, the merchant client device 104b can send the payment request to the server device(s) 106 prior to obtaining a total payment amount. If the initial payment request does not include a payment amount for the payment transaction, the server device(s) 106 may wait for and/or request a payment amount and/or other payment transaction information from the merchant client device 104b before generating the payment confirmation request. After receiving the payment amount or other payment transaction information from the merchant client device 104b, the server device(s) 106 generate the payment confirmation request and sends the payment confirmation request to the user client device 104a.

Alternatively, the payment confirmation request may include payment transaction information that describes the payment transaction without including the payment amount. Specifically, the payment confirmation request can include sufficient information to allow the user to identify the specific payment transaction and verify that the payment transaction is not fraudulent without providing every detail of the payment transaction up front. For example, the server device(s) 106 can send a payment confirmation request to the user client device 104a that includes a merchant identifier, a time, and a location of the payment transaction. The user can view the payment confirmation request on the user client device 104a and provide authorization to initiate the payment transaction before the checkout process is complete. Thus, the user can pre-authorize the payment transaction and then complete the checkout process to obtain the final payment amount.

In one or more embodiments, the payment confirmation request is a push notification that the server device(s) 106 send to the user client device 104a. For example, the payment confirmation request can be a notification that appears in a notification tray on the user client device 104a. The user can interact with the notification in the notification tray to view the payment transaction information and to provide authorization for the payment transaction. Additionally, the payment confirmation request can appear on a lock screen of the user client device 104a to allow the user to interact with the payment confirmation request without unlocking the user client device or opening a specific application. The user client device 104a generates 226 a payment confirmation response based on the user interaction (e.g., based on the user authorizing the payment transaction) and sends 228 the payment confirmation response to the server device(s) 106.

Based on receiving the authorization from the user client device 104a, the server device(s) 106 then initiate the payment transaction between the merchant and the user. Specifically, the server device(s) 106 initiate the payment transaction by generating 230 a payment transaction request. In one or more embodiments, the payment transaction request includes payment transaction information that allows the payment network to process the payment transaction between the user and the merchant. For example, the payment transaction request can include a merchant identifier, a user identifier, a payment account for the user, a payment receipt account for the merchant, and a payment amount.

The server device(s) 106 then send 232 the generated payment transaction request to the payment network 110. The payment network 110 processes 234 the payment transaction based on the payment transaction information in the payment transaction request. For example, the payment network 110 processes the payment transaction by transferring funds equal to the payment amount from the payment account for the user to the payment receipt account for the merchant. Transferring funds may involve communicating with one or more gateway systems, card networks or bank systems. After the payment network 110 processes the payment transaction, the payment network 110 sends 236 a payment transaction response to the server device(s) 106 indicating that the payment transaction was successful. Alternatively, the server device(s) 106 can send payment authorization to the merchant client device 104*b*, with a payment token, to allow the merchant client device 104*b* to initiate the payment transaction with the payment network 110.

Based on receiving the payment transaction response from the payment network 110, the server device(s) 106 send 238 successful payment transaction messages to the merchant client device 104*b* and the user client device 104*a*. Specifically, the successful payment transaction messages indicate to the merchant and the user that the payment transaction was successful. The merchant can then complete a checkout process for the goods or services.

Although FIGS. 2A-2B illustrate a process that requests authorization from the user before initiating a payment transaction between a user and a merchant, the payment system may allow a user to authorize payment transactions asynchronously with a purchase of goods or services. In particular, one or more embodiments of the payment system allow a merchant to initiate a payment transaction with a user without receiving explicit authorization from the user at the time the user purchases goods or services. For example, the payment system may allow a user to pre-authorize payment transactions for specific merchants, time periods, and/or goods/services.

To illustrate, a user that regularly visits a merchant store to purchase goods can provide the payment system with pre-authorization to initiate payment transactions between the user and the merchant. Providing pre-authorization to the payment system can allow the user to enter the merchant store, pick up an item, and leave without needing to go through the checkout process. For example, the payment system can authorize the payment transaction for the item based on an image capture device in the merchant store capturing an image of the user. A merchant client device can send the image of the user to the server device(s), which determine the identity of the user, identify a payment account for the user, and initiate the payment transaction based on the user's pre-authorization. Additionally, the merchant can verify the identity of the user prior to processing the transaction, for example, by selecting the user from a list of candidate users as described above.

As will be described in more detail below, the components of the payment system 100 as described with regard to FIG. 1, can provide, along and/or in combination with the other components, one or more graphical user interfaces. In particular, the components can allow a user to interact with a collection of display elements for a variety of purposes. In particular, FIGS. 3A-3F and the description that follows illustrate various example embodiments of the user interfaces and features of a client application that allows a merchant to initiate a payment transaction with a user, and a user interface that allows the user to provide authorization to initiate the payment transaction.

For example, FIGS. 3A-3C and 3F illustrate various views of GUIs provided by a client application at a merchant client device to facilitate initiating a payment transaction between a user and a merchant for purchasing goods or services. For example, FIGS. 3A-3C and 3F illustrate GUIs on a merchant client device 300 that allow a merchant to view and perform actions relative to a purchase for goods or services. Additionally, FIGS. 3D-3E illustrate views of GUIs on a user client device 302 that allow a user (e.g., a customer) to view and authorize a payment transaction associated with a purchase for goods or services.

As stated, FIGS. 3A-3C and 3F illustrate the merchant client device 300 a touchscreen computing device. The touchscreen computing device may be a computing device that a merchant holds in his or her hands or a computing device that is affixed near a checkout location for use by the merchant or the user. FIGS. 3D and 3E illustrate the user client device 302 as a handheld device. As used herein the term "handheld device" refers to a device sized and configured to be held/operated in a single hand of a user. In additional or alternative example, however, the merchant client device and/or the user client device can be any suitable computing device, such as, but not limited to, a tablet device, a handheld device, larger wireless devices, laptop or desktop computer, a personal-digital assistant device, and/or any other suitable computing device can perform one or more of the processes and/or operations described herein.

Figure 3A:
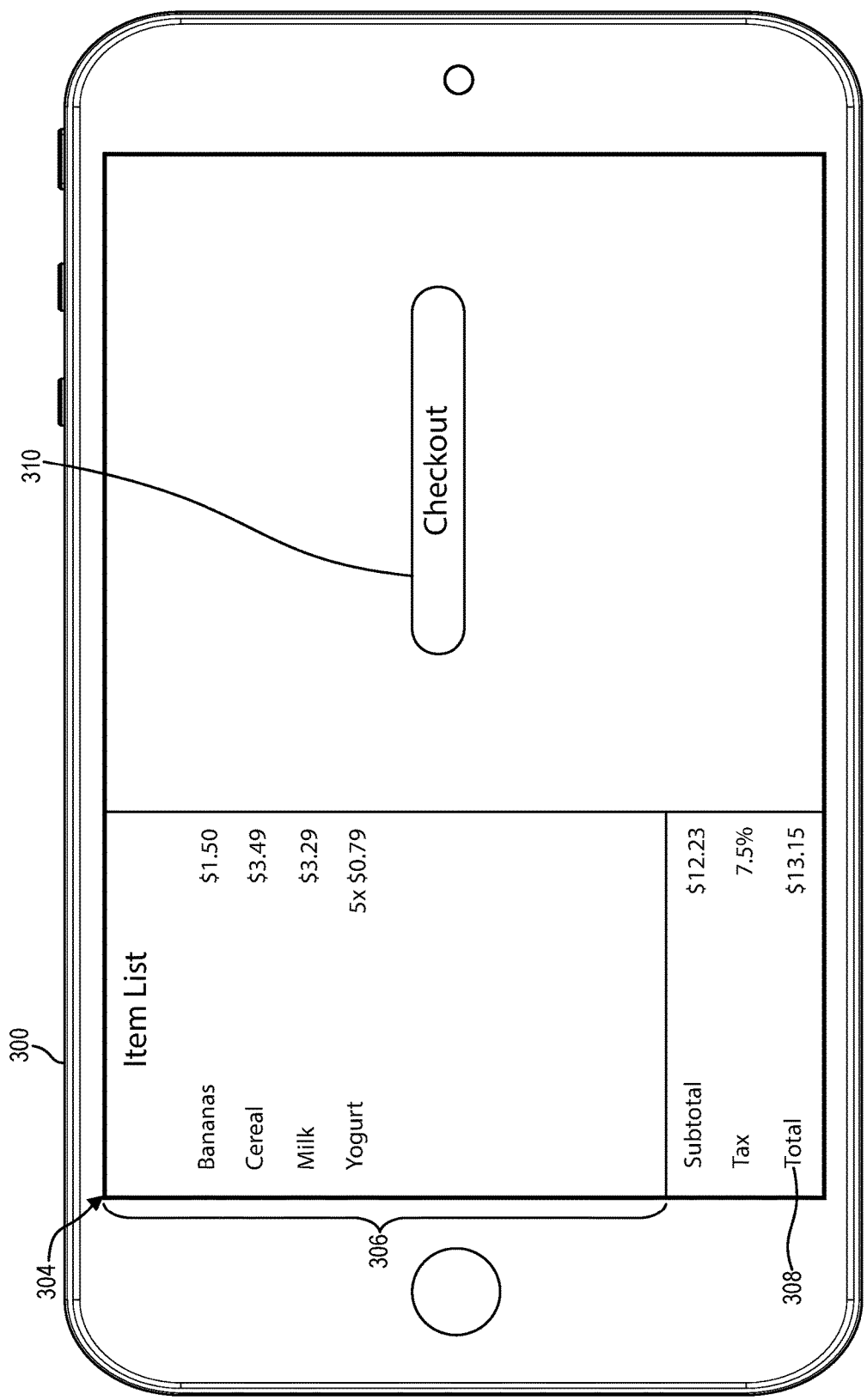

With reference to FIG. 3A, the merchant client device includes a client application that allows a merchant to view and interact with information related to with payment transaction information and purchase order information for use in view a list of goods for a purchase order by a user. Specifically, the client application includes a purchase order interface 304 that displays information corresponding to the purchase order and a payment transaction associated with the purchase order. For example, the purchase order interface 304 can include an item list 306 that shows the items that the merchant has scanned or added to the purchase order.

Additionally, the purchase order interface 304 can indicate the payment amounts associated with each item in the item list 306. The purchase order interface 304 also includes a total payment amount 308 (based on a subtotal of the cost of all items and tax, etc.) associated with the item list. The total payment amount 308 can change as the number and type of items in the item list 306 change. For example, if the merchant adds items to or removes items from the item list, the total payment amount 308 changes accordingly.

In one or more embodiments, the purchase order interface 304 includes a checkout element 310 that allows the merchant to initiate a checkout process for a purchase order. Specifically, the checkout process can begin a process to initiate a payment transaction for the purchase order. For example, if the merchant selects the checkout element 310, the client application can generate a payment request with the payment transaction information and an image of the user. Alternatively, as previously mentioned, the merchant client device 300 can generate an initial payment request with the image of the user prior to obtaining a total payment amount for the purchase order.

In at least some embodiments, the purchase order interface 304 displays an image or video view corresponding to an image capture device. For example, the purchase order interface 304 can include a view that includes current video that the image capture device is capturing. To illustrate, the purchase order interface 304 can display the view corresponding to the image capture device to allow the merchant to see what the merchant client device 300 is sending to the server device(s) (i.e., the server device(s) 106 of FIG. 1).

In at least some instances, the client application allows the employee to interact with the merchant client device 300 to capture an image of the user. To illustrate, the client application can allow the merchant to select a visible face of the user in the view corresponding to the image capture device to capture an image of the user. After capturing the image of the user based on the merchant's input and/or after the user selects the checkout option, the merchant client device 300 can send the image of the user to the server device(s) (e.g., to a social networking system).

As previously mentioned, the server device(s) can determine the identity by using input from the merchant. Specifically, the server device(s) can identify a plurality of users at the merchant's location and send images of one or more of the plurality of users to the merchant client device 300. For example, the server device(s) can send images of the identified users by obtaining the images of the identified users from corresponding user accounts of a social networking system. In one or more embodiments, the server device(s) access images that the users have previously uploaded to the server device(s), including profile photos and images from online photo albums.

In one or more embodiments, users who register with a social networking system can provide authorization to the server device(s) to use some or all of the images in the users' accounts. For example, the users may provide authorization to access the users' profile photos, specific albums, or specific individual photos that include the user. The server device(s) can select images that clearly depict the users' faces for use in facial recognition processes when comparing to a captured image from the merchant client device 300. In at least some instances, registered users can select one or more images for the server device(s) to use in facial recognition processes.

According to one or more embodiments, the server device(s) select the same image for each user when providing images to merchants. In particular, the server device(s) can determine that a particular image associated with a user's account provides the greatest likelihood of identifying the user in captured images from merchants. For example, the server device(s) can rank images of the user based on visible features of the user's face in the images, quality of the images, size/resolution of the images, chronological recency (i.e., based on timestamps or upload dates), and/or other characteristics of the images. To illustrate, the server device(s) can rank a first image with a first quality/size higher than a second image with a second image quality/size lower than the first image. The server device(s) can then select the highest ranked image for a user to provide to the merchant client device. Alternatively, the server device(s) can use other methods for selecting images of users to send to merchants, such as randomly selecting images that include the users' faces.

Figure 3B:
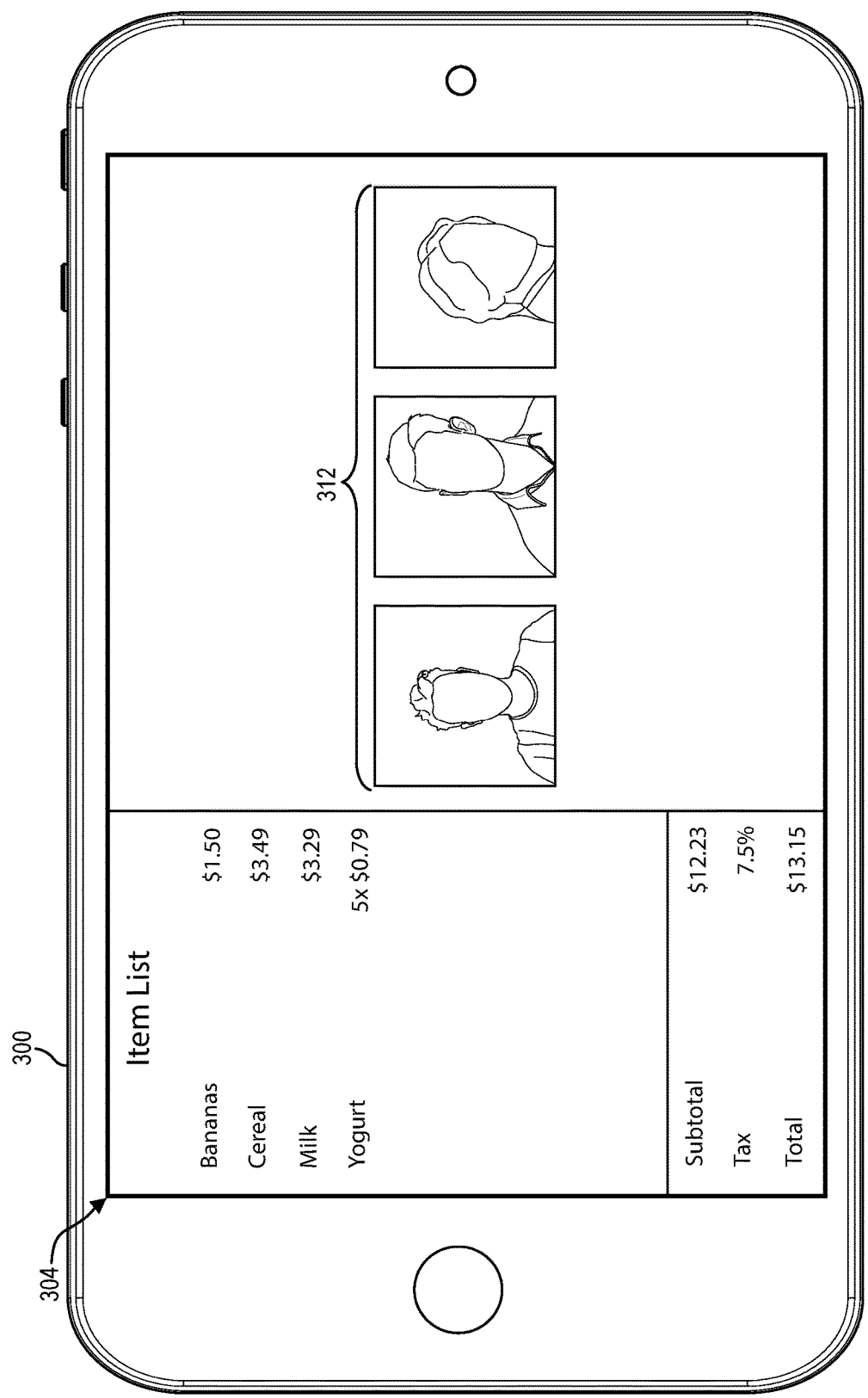

The client application at the merchant client device 300 displays the images received from the server device(s) to the merchant performing the checkout process. For example, the client application can display the received images in a section of the purchase order interface or another interface. The client application can display a plurality of images 312 simultaneously (e.g., side-by-side) to allow the merchant to look at all of the received images and compare the faces in the images to the user at the checkout location, as illustrated in FIG. 3B. To illustrate, the merchant can identify that a single image from the images 312 includes the user.

In one or more embodiments, the client application or the server device(s) perform modifications to the images 312 for displaying on the merchant client device 300 to allow the merchant to more easily identify the user. For example, the server device(s) can crop the images 312 to the faces of the users and resize the images to zoom in on the corresponding faces. To illustrate, the server device(s) may crop the images 312 to remove faces of other people from the images. Additionally, the server device(s) can rotate the images 312 or use other image processing techniques to make the faces more easily identifiable to the merchant and/or to fit the images to specific boundaries in the purchase order interface.

Once the client application displays the images of a plurality of users at the merchant location, the merchant can select one of the images 312 corresponding to the user purchasing goods or services. For example, the merchant can tap on the image using a touchscreen interface. When the merchant selects the image of the user, the merchant client device 300 sends an indication of the selected image to the server device(s). To illustrate, the merchant client device 300 can send either the selected image or an identifier associated with the selected image back to the server device(s).

The server device(s) then determine the identity of the user. Although the server device(s) can use input from the merchant to determine the identity of the user, other embodiments of the payment system determine the identity of the user without sending images to the merchant client device and without receiving verification of the user's identity from the merchant client device 300. Specifically, the server device(s) can determine the identity of the user based only on a comparison of the captured image of the user to images associated with a user account for the user.

Based on the identity of the user, the server device(s) identify a payment account for the user for use in processing the payment transaction between the user and the merchant. For example, the server device(s) can access the user account for the user and identify the payment account based on an association of the payment account with the user account. To illustrate, the user can authorize the payment system to use one or more payment accounts for payment transactions between the user and other users and/or merchants. The user account can store any number and types of compatible payment accounts that the user authorizes for use in payment transactions.

In one or more embodiments, the payment system uses a payment account for the payment transaction based on input from the merchant client device 300. In particular, the server device(s) select a plurality of payment accounts from the user account for the user. The server device(s) can send payment tokens representing the selected payment accounts to the server device(s), as previously mentioned. Alternatively, the server device(s) can send simple identifiers for the payment accounts (e.g., account name or nickname, account type, card issuer) to the merchant client device 300.

Figure 3C:
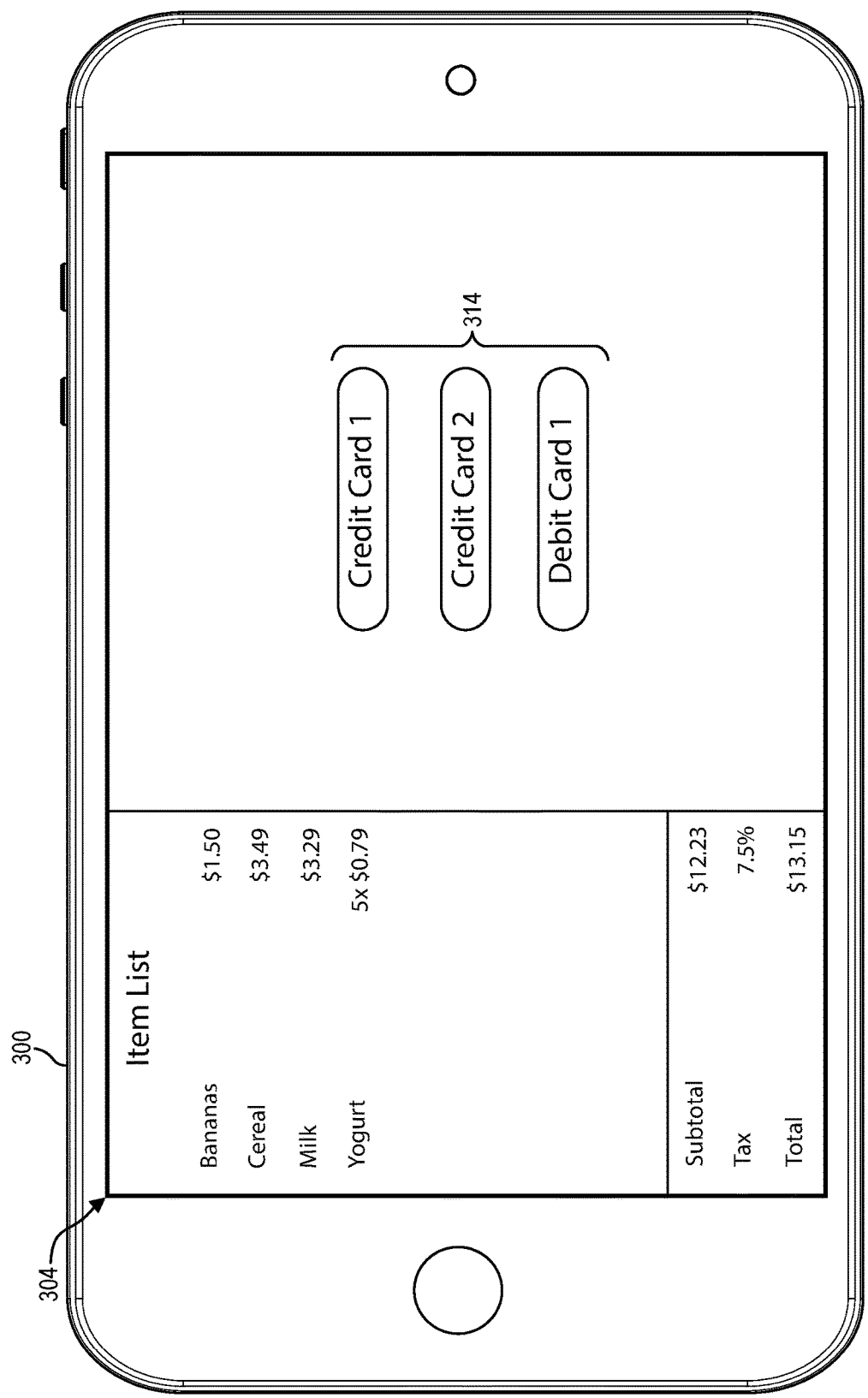

The client application displays the payment accounts available for the user based on the received payment tokens or identifiers that represent the payment accounts. As FIG. 3C illustrates, the merchant client device 300 displays the payment accounts for the user in the purchase order interface. The purchase order interface 304 includes the payment accounts for the user in a list or grouping, for example, by replacing the images of the users with a list 314 of payment accounts.

In one or more embodiments, the purchase order interface 304 display selectable elements for the payment accounts in the list 314 of payment accounts so that the merchant can select one of the payment accounts to use for the payment transaction. The merchant can select one of the payment accounts to use for the payment transaction by tapping on the corresponding element via the touchscreen interface, though the merchant client device 300 may accept any suitable input. Selecting a payment account from the list 314 causes the merchant client device 300 to send an indication of the selection to the server device(s). For example, the merchant client device 300 can send the payment token or other identifier associated with the selected payment account to the server device(s).

When the server device(s) receive the selection of the payment account or otherwise identify the payment account, they server devices(s) request authorization for the payment transaction. In particular, the server device(s) send a notification to a user client device associated with the user with a request to authorize the payment transaction with the merchant. FIGS. 3D-3E illustrate a user client device 302 that is associated with a user purchasing items from a merchant as in FIGS. 3A-3C. Although FIGS. 3D-3E illustrate embodiments in which the payment system requires the user to provide authorization prior to initiating payment transactions between the merchant and the user, other embodiments may not require authorization from the user at the time synchronously with the user's purchase of goods or services.

The user client device 302 can include a client application allows the user client device 302 to communicate with the server device(s) and/or other devices or systems associated with the payment system. For example, the client application can be a social networking application that communicates with a social networking system at the server device(s) to send and receive social networking information associated with the user and other users registered with the social networking system. The client application can also allow the user client device 302 to send and receive payment information associated with payment transactions involving the user.

In at least some embodiments, the server device(s) identify a user client device 302 associated with the user based on the user account. Specifically, the server device(s) identify a user client device 302 that by which the user has communicated with the server device(s) using the client application. For example, the server device(s) can identify the user client device 302 based on the user installing the client application onto the user client device 302 and logging into a service associated with the client application.

In one or more embodiments, after the server device(s) determine an identity of a user associated with a payment transaction and a payment account for the payment transaction, the server device(s) can communicate with the user client device 302 using the client application. For example, the client application can receive a payment confirmation request including a push notification 316 from the server device(s) indicating the payment transaction between the merchant and the user. The push notification 316 can appear in a notification tray and/or, as illustrated in FIG. 3D, in a notification area of a lock screen 318 of the user client device 302.

More particularly, FIG. 3D illustrates a push notification 316 that appears on the lock screen of the user client device 302. The notification 316 includes the details of the payment transaction so that the user can identify the payment transaction and verify that the transaction is valid and not fraudulent. For example, the notification 316 can include the merchant, the payment amount, the time/date, identification of the client application, and or other information that allows the user to verify the payment transaction.

Additionally, the notification 316 can include a request for the user to authorize the payment transaction. The notification 316 can include a plurality of elements that allow the user to interact with the notification 316 to respond to the request without unlocking the phone and without opening the client application. In particular, the notification 316 includes a yes element 320 and a no element 322 that allow the user to choose to authorize the payment transaction or deny authorization of the payment transaction. Selecting the yes element 320 to authorize the payment transaction causes the user client device 302 to send authorization to the server device(s). Alternatively, the user can interact with the notification by performing a swipe right or swipe left action to authorize or reject the payment transaction. In another alternative example, the user can interact with the notification by performing a swipe right or swipe left to select different payment options (e.g., swipe left for a first payment account, swipe right for a second payment account). The server device(s) then contact the payment network to process the payment transaction and transfer funds from the payment account for the user to a payment receipt account for the merchant.

As previously mentioned, if the payment system has not already identified a payment account for using with the payment transaction, the user can select the payment account by interacting with the notification. For example, the user can tap or swipe the notification 316 to open a separate application (e.g., a digital wallet or payment application) to select a payment account. The user can select a payment account to use in the payment transaction and provide authorization for the payment transaction.

In response to a successful payment transaction, the user client device 302 receives a response from the server client device(s) indicating that the payment transaction was successful. Specifically, the client application can receive a second push notification 324 that appears on the lock screen 318 of the user client device 302. The second push notification 324 can be a successful payment transaction message that indicates that the payment transaction with the merchant and for the payment amount was successful. FIG. 3E illustrates the push notification 324 appearing on a lock screen 318 of the user client device 302 indicating that the payment transaction was successful. Thus, the user can verify that the payment transaction was successful by looking at the notification 324 on the lock screen 318 or in the notification area of the operating system of the user client device 302.

Figure 3F:
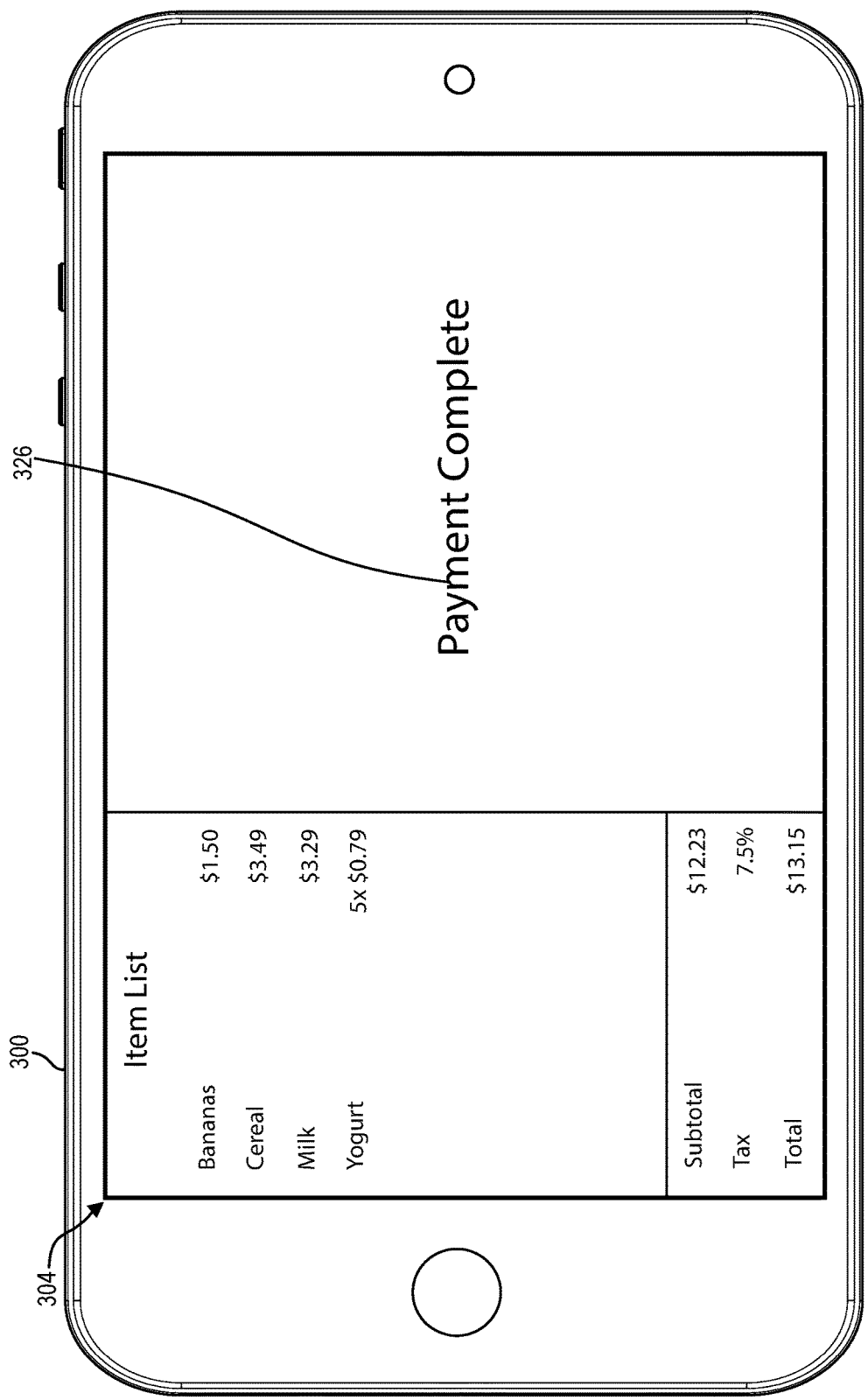

FIG. 3F illustrates a successful payment transaction message 324 in the client application of the merchant client device 300 in response to the payment network successfully processing the payment transaction. For example, the client application can display the successful payment transaction message 326 in the section of the purchase order interface 304 that displayed the images of the users and the payment accounts of the identified user. After the merchant verifies that the payment transaction was successful, the merchant can provide the user with the items in the purchase order interface 304 to finish the purchase order.

FIGS. 1-3F, the corresponding text, and the examples, provide a number of different systems and devices for processing electronic payment transactions using a payment system. In addition to the foregoing, embodiments can be described in terms of flowcharts comprising acts and steps in a method for accomplishing a particular result. For example, FIG. 4 illustrates a flowchart of an exemplary method in accordance with one or more embodiments.

Figure 4:
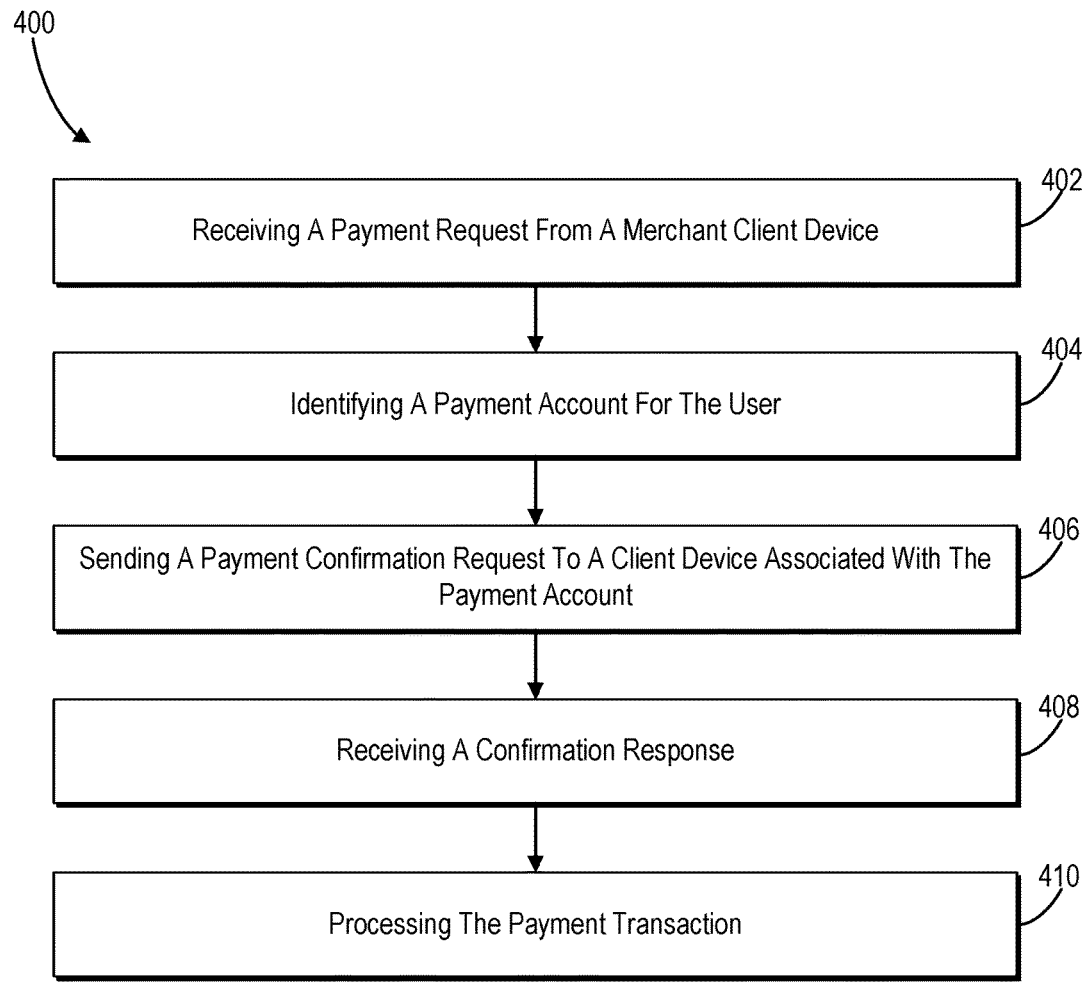
FIG. 4 illustrates a flow chart of a series of acts in a method of facial recognition identification for processing payment transactions in accordance with one or more embodiments.

FIG. 4 illustrates a flowchart of a method 400 of facial recognition identification for processing payment transactions. The method 400 includes an act 402 of receiving a payment request to initiate an in-store payment transaction. For example, act 402 involves receiving, from a merchant client device 104b, 300, a payment request to initiate an in-store payment transaction between a user and a merchant, wherein the payment request comprises an image of the user. Additionally, the payment request can include a payment amount, a merchant identifier, and a merchant location. Alternatively, act 402 can involve receiving a first payment request that includes the image of the user, but does not include a payment amount for the in-store payment transaction. Act 402 can then involve receiving a second payment request after determining an identity of the user, the second payment request including the payment amount for the in-store payment transaction.

The method 400 also includes an act 404 of identifying a payment account for the user. For example, act 404 involves identifying a payment account for the user based on the image of the user. To illustrate, act 404 can involve comparing the image of the user to a plurality of images of users, determining that the image of the user corresponds to a selected image from the plurality of images of users, and identifying a payment account associated with the selected image. For example, act 404 can involve identifying a plurality of payment accounts associated with a social networking account for the user, sending, to the merchant client device 104b, 300, a plurality of indicators associated with the plurality of payment accounts, and receiving, from the merchant client device 104b, 300, a selected indicator from the plurality of indicators associated with the plurality of payment accounts.

Additionally, the plurality of indicators can include a plurality of payment tokens, each token corresponding to a payment account from the plurality of payment accounts. For example, the plurality of payment tokens can include payment tokens generated by a payment network to represent the plurality of payment accounts. Alternatively, the plurality of indicators can include a plurality of nicknames that identify the plurality of accounts.

Act 404 can involve obtaining an image from a social networking account for the user, sending the obtained image of the user to the merchant client device, and receiving, from the merchant client device, an approval message indicating that the user matches a face in the obtained image from the social networking account for the user.

As part of act 404, or as an additional act, the method 400 can include identifying, for the user, a plurality of images associated with a social networking account for the user, ranking the plurality of images based on a plurality of characteristics of the plurality of images, and selecting a highest ranked image from the plurality of images for comparing to the image of the user from the payment request to determine an identity of the user. For example, the method 400 can include ranking the plurality of images based on image quality, image size and resolution, chronological recency, or visual characteristics of faces in the plurality of images.

As part of act 404, or as an additional act, the method 400 can include determining a location associated with the in-store payment transaction, and identifying a plurality of candidate users from a plurality of users within a predetermined distance from the location associated with the in-store payment transaction. For example, the method 400 can include identifying a plurality of users at or near the location based on location data from a plurality of client devices associated with the plurality of users. Additionally, the method 400 can compare a face of the user in the image of the user to a plurality of faces in a plurality of images associated with the plurality of candidate users, determining that the image of the user corresponds to a selected image from the plurality of images, and identifying a payment account associated with the selected image.

The method 400 further includes an act 406 of sending a payment confirmation request to the user. For example, act 406 involves sending a payment confirmation request to a client device 104a, 302 associated with the payment account for the user, the payment confirmation request corresponding to the payment request to initiate the in-store payment transaction. Act 406 can involve sending a push notification comprising payment data associated with the in-store payment transaction. To illustrate, act 406 can involve sending the push notification 316 to appear on a lock screen 318 or in a notification tray of the client device 104a, 302 associated with the payment account for the user.

As part of act 404, or as an additional act, the method 400 can include sending, to the merchant client device 104b, 300, a plurality of images 312 corresponding to a plurality of users of a social networking system. The method 400 can also include receiving, from the merchant client device 104b, 300, a selected image from the plurality of images 312, and sending the payment confirmation request to a client device associated with a payment account of a user corresponding to the selected image. For example, the method 400 can include selecting the plurality of users based on identifying the plurality of users in the image of the user from the merchant client device 104b, 300. Alternatively, the method 400 can include selecting the plurality of users randomly from a plurality of users at the location associated with the in-store payment transaction.

Additionally, the method 400 includes an act 408 of receiving a confirmation response from the user. For example, act 408 involves receiving a confirmation response from the client device to process the in-store payment transaction. Act 408 can involve receiving authorization to initiate the in-store payment transaction in the confirmation response from the client device 104a, 302.

The method 400 also includes an act 410 of processing the in-store payment transaction. For example, act 410 involves processing, using the payment account for the user, the in-store payment transaction based on the received confirmation response. Act 410 can involve sending payment data to a payment network to process the in-store payment transaction, the payment data comprising the payment account for the user, a payment receipt account for the merchant, and a payment amount for the in-store payment transaction.

Figure 5:
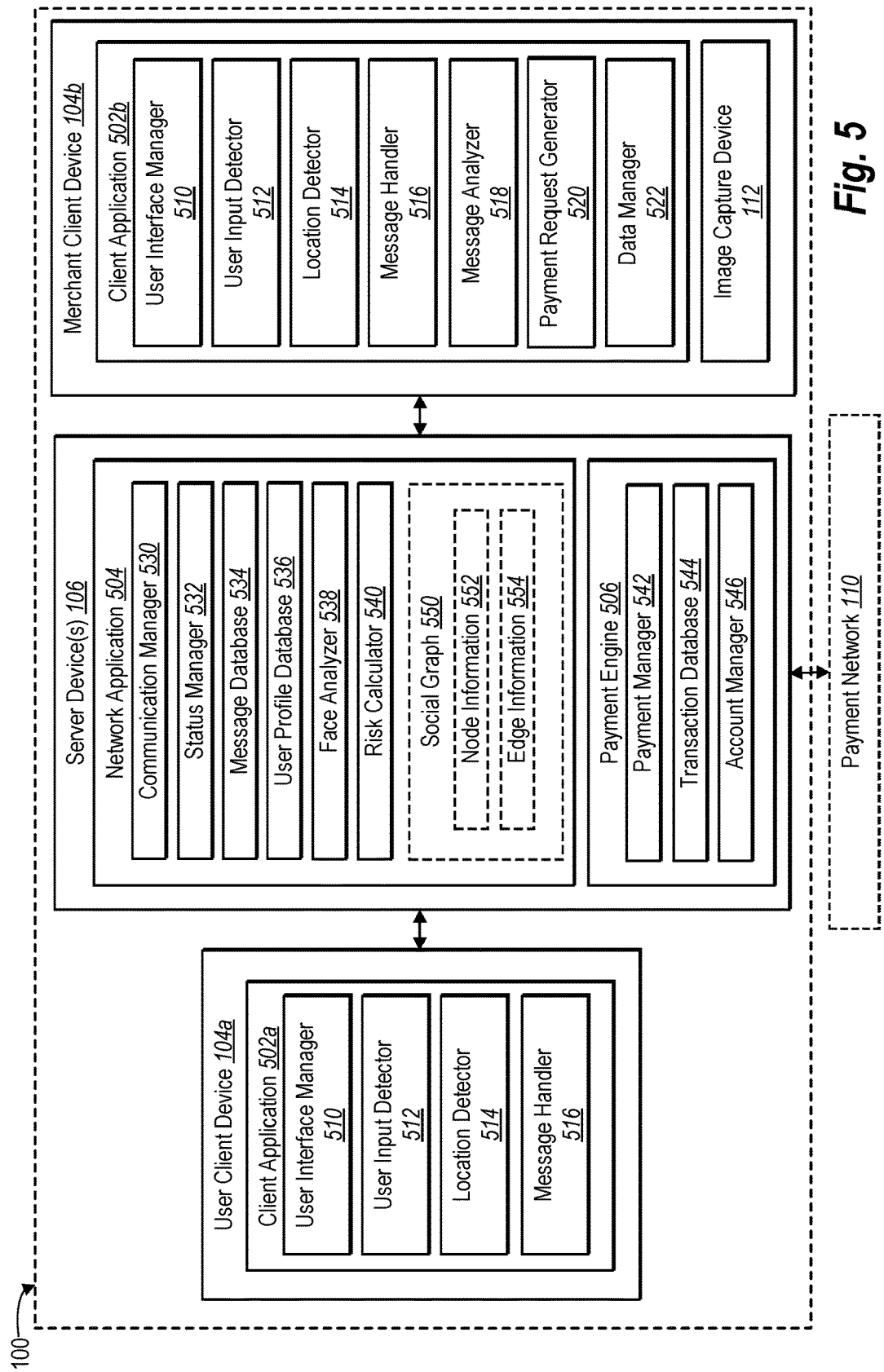
FIG. 5 illustrates a detailed schematic diagram of the environment of FIG. 1 in accordance with one or more embodiments.

FIG. 5 illustrates a schematic diagram illustrating additional details of the environment of FIG. 1 including the components of the payment system 100 and the payment network 110. As shown, the payment system 100 includes a user client device 104a, a merchant client device 104b (collectively "client devices"), and server device(s) 106. In general, the payment system 100 allows a user associated with the user client device to engage in in-store electronic payment transactions with a merchant associated with the merchant client device. Additionally, the payment system 100 can allow users to exchange messages with merchants or other users via the respective client devices.

As shown, the payment system 100 includes various components on the user client device 104a, the merchant client device 104*b*, and the server device(s) 106. For example, FIG. 5 illustrates that the client devices 104*a*, 104*b* each include a client application 502*a*, 502*b* (e.g., a messaging application, a social networking application, or an e-commerce application) with various components, and the server device(s) 106 include a network application 504 and a payment engine 506 with various components. The merchant client device 104*b* also includes one or more image capture devices 508. The payment network 110 is illustrated as a component or system separate from the payment system 100, though other embodiments of the payment system 100 may include some or all of the components/functionality of the payment network 110. The components of the client applications 502*a*, 502*b*, the network application 504, and the payment engine 506 work together to allow a user to send payments to a merchant, as described in greater detail below.

The client applications 502*a*, 502*b* include a user interface manager 510, a user input detector 512, a location detector 514, and a message handler 516. The client application 502*b* of the merchant client device 104*b* further includes a message analyzer 518, a payment request generator 520, and a data manager 522. FIG. 5 illustrates that the network application includes a communication manager 530, a status manager 532, a message database 534, a user profile database 536, a face analyzer 538, and a risk calculator 540. As described below, the network application can also optionally include a social graph 550, which includes node information 552 and edge information 554. FIG. 5 further illustrates that the payment engine 506 includes a payment manager 542, a transaction database 544, and an account manager 546. Each of the components of the user client device, the merchant client device, and the server device(s) can communicate with each other or with components of the payment network 110 using any suitable communication technologies. It will be recognized that although the components of the client devices and the server device(s) are shown to be separate in FIG. 5, any of the components may be combined into fewer components, such as into a single facility or module, or divided into more components as may serve a particular embodiment. While FIG. 5 describes certain components as part of the client applications and other components as part of the network application, the present disclosure is not so limited. In alternative embodiments, one or more of the components shown as part of the client applications can be part of the network application or vice versa. Similarly, one or more components shown as part of the network application can be part of the payment engine or vice versa.

The components can include software, hardware, or both. For example, the components can include computer instructions stored on a non-transitory computer-readable storage medium and executable by at least one processor of the client devices 104*a*, 104*b* or the server device(s) 106. When executed by the at least one processor, the computer-executable instructions can cause the client devices 104*a*, 104*b* or the server device(s) 106 to perform the methods and processes described herein. Alternatively, the components can include hardware, such as a special purpose processing device to perform a certain function or group of functions. Additionally or alternatively, the components can include a combination of computer-executable instructions and hardware.

In one or more embodiments, the client applications 502*a*, 502*b* on both the user client device 104*a* and the merchant client device 104*b* are native applications installed on the client devices 104*a*, 104*b*. For example, the client applications 502*a*, 502*b* on one or both client devices 104*a*, 104*b* may be a mobile application that installs and runs on a mobile device, such as a smart phone or a tablet. Alternatively, the one or more both of the client applications 502*a*, 502*b* may be a desktop application, widget, or other form of a native computer program that runs on a desktop device or laptop device. Alternatively, the client applications 502*a*, 502*b* may be a remote application, such as a web application executed within a web browser, that the client devices 104*a*, 104*b* access.

As mentioned, the client applications 502*a*, 502*b* on the user client device 104*a* and the merchant client device 104*b* can include a user interface manager 510. The user interface manager 510 of the user client device 104*a* provides, manages, and/or controls a user interface that allows a user to view payment transactions, interact with other users by sending/receiving messages, and/or interacting with merchants. For example, the user interface manager 510 can provide a user interface that facilitates the composition of instant messages, social networking posts, or other content.

The user interface manager 510 of the merchant client device 104*b* provides, manages, and/or controls a user interface that allows a merchant to view goods or services associated with a purchase order by a user. Additionally, the user interface manager 510 allows the merchant to perform steps for initiating a payment transaction with the user in connection with a purchase order. For example, the user interface manager 510 can provide a user interface that facilitates the selection of images of users, payment accounts for processing payment transactions in connection with purchase orders, or sending messages to users.

More specifically, the user interface manager 510 facilitates the display of a user interface (e.g., by way of a display device associated with the corresponding client device). For example, the user interface may be composed of a plurality of graphical components, objects, and/or elements that allow a user to compose, send and receive messages or payments. More particularly, the user interface manager 510 may direct the corresponding client device to display a group of graphical components, objects and/or elements that enable a user to view a messaging thread.

As further illustrated in FIG. 5, the client applications 502*a*, 502*b* can include a user input detector 512. In one or more embodiments, the user input detector 512 can detect, receive, and/or facilitate user input in any suitable manner. In some examples, the user input detector 512 can detect one or more user interactions with respect to the user interface. As referred to herein, a "user interaction" means a single interaction, or combination of interactions, received from a user by way of one or more input devices.

For example, user input detector 512 can detect a user interaction from a keyboard, mouse, touch pad, touchscreen, and/or any other input device. In the event the client devices 104*a*, 104*b* include a touchscreen, the user input detector can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The client applications 502*a*, 502*b* can perform one or more functions in response to the user input detector 512 detecting user input and/or receiving other data. Generally, a user (or merchant) can control, navigate within, and otherwise use the client application by providing one or more user inputs that the user input detector can detect. For example, in response to the user input detector 512 detecting user input, one or more components of the client application allow a user to select elements in a user interface and/or generate messages by inputting text or other content. In addition, in response to the user input detector 512 detecting user input, one or more components of the client application allow a user to navigate through one or more user interfaces to review received messages, contacts, transaction history, etc.

The client applications 502a, 502b also includes a location detector 514 to facilitate the collection and provision of location data associated with the respective client devices. For example, the location detector 514 can access or identify a location of the client device based on GPS information from the client device, cell tower triangulation, wireless communication beacons, WIFI received signal strength indication, WIFI wireless fingerprinting, radio-frequency identification, near-field communication, by analyzing messages, or based on data from other sources. The location detector 514 can then provide the location of the corresponding client device to the network application.

Additionally, the location detector 514 of the merchant client device 104b can use information with other devices or use information from a map of the merchant store to determine a location of the merchant client device. For example, the location detector 514 can use information from a generated map (e.g., a 3D map) of the store to determine the location of the merchant client device. The location detector 514 can also use the positioning of the image capture device or a plurality of image capture devices to determine a location of the merchant client device 104b and the image capture device(s) 112.

As further illustrated in FIG. 5, the client applications 502a, 502b include a message handler 516 that manages messages provided to or sent from the client application. For example, the message handler 516 can interact with the user interface manager 510 and the user input detector 512 to coordinate the sending and receiving of payment requests using the client application. The message handler 516 may direct the sending and receiving of content (e.g., images), payment requests, authorization messages, communication messages, or other messages to and from the network application or payment engine over the course of an electronic payment transaction between a user and a merchant. The message handler 516 may organize incoming and outgoing messages and direct the user interface manager to display messages, such as payment confirmation requests or push notifications.

The client application 502b of the merchant client device 104b further includes a message analyzer 518. The message analyzer 518 can analyze messages sent from and received by the client application for events or attachments. For example, the message analyzer 518 identifies images attached to messages from the network application with relation to payment requests. Specifically, when the merchant client device 104b sends a payment request to the server device(s) 106, the network application 504 can obtain images of users to send to the merchant client device 104b to allow the merchant to verify an identity of a user. The message analyzer 518 analyzes the message to which the images are attached and extracts the images from the messages.

The client application 502b of the merchant client device 104b also includes a payment request generator 520 to create payment requests corresponding to payment transactions. For example, the payment request generator 520 can generate a data package that includes payment data such as a payment amount, an image of a user attempting to purchase goods or services, and a merchant identifier. Additionally, the payment data can include payment receipt account information for the merchant, authorization information, currency information, and other data that may be helpful to facilitate a payment from the user to the merchant. As described previously, the payment request may include only some of the payment transaction information, and the payment request generator 520 may create one or more additional payment requests to provide more payment data.

The client application 502b of the merchant client device 104b can also include a data manager 522 to maintain message data representative of data used in connection with composing, sending, and receiving messages or data between a merchant and users or the server device(s). For example, data can include message logs, contact lists, content, past communications, past payment transactions, and other similar types of data that the client application 502b can use in connection with providing the ability for the merchant to engage in payment transactions using the client application.

The merchant client device 104b can also include an image capture device 112. The image capture device 112 facilitates capturing of images of users during checkout processes for purchasing goods or services from the merchant. As mentioned previously, the image capture device 112 can capture video or single frame images of the users engaged in the checkout process to obtain images of the users for determining identities of the users. For example, the image capture device 112 can be a digital camera that is part of, or is connected to, the merchant client device. Alternatively, the image capture device 112 can include a digital camera that is separate from the merchant client device and sends captured images to the merchant client device via a wired or wireless network connection.

As briefly mentioned above, in addition to the client devices, the payment system 100 can further include a network application 504 that is implemented in whole or in part on the server device(s) 106. In one or more embodiments of the present disclosure, the network application is part of a social-networking system (such as but not limited to FACEBOOK™, but in other embodiments the network application 504 may comprise another type of applications, including but not limited to an e-mail application, search engine application, banking application, or any number of other application types that utilizes user accounts.

In one or more embodiments where the network application 504 comprises a social-networking system, the network application 504 may include a social graph for representing and analyzing a plurality of users and concepts. Node storage of the social graph can store node information comprising nodes for users, nodes for concepts, nodes for transactions, and nodes for items. Edge storage of the social graph can store edge information comprising relationships between nodes and/or actions occurring within the social-networking system. Further detail regarding social-networking systems, social graphs, edges, and nodes is presented below with respect to FIG. 8.

As illustrated in FIG. 5, the communication manager 530 processes messages received from client applications. For example, the communication manager 530 can interact with a message handler of a client application. The communication manager 530 can act as a director for messages or data sent to and received from users or merchants involved in a payment transaction. The communication manager 530 may receive a payment request from a client application of a merchant client device and identify payment data in the payment request. One will appreciate that the communication manager 530 can also allow users and/or merchants to exchange messages via the network application. Additionally, the communication manager 530 can send a message for a recipient to multiple client devices associated with the recipient (i.e., each device upon which the user has installed a version of the client application).

The status manager 532 can track the status of users (e.g., users, merchants) of the client applications and/or the client devices. For example the status manager 532 can identify when a user is logged into the client application, when a user is active on the client application, or when a client device associated with a user or user account is online or active. The status manager 532 can send indications (such as push notifications) to the client application to notify the client application of the status of users, device, messages, or payments. The status manager 532 can also manage a location of users based on location data received from the client devices of the users. The status manager 532 can communicate with the user interface manager to present status notifications to users.

The network application 504 may also include a message database 534. The message database 534 can maintain message data representative of content of messages from users and merchants involved in payment transactions and/or messaging threads. The message database 534 may maintain status data representative of the information mentioned above that the status manager tracks. The message database 534 can thus provide an archive of messaging threads, which the network application 504 can provide to a user on demand or once a user logs into the client application using a new computing device.

The network application 504 can also include a user profile database 536. The user profile database 536 manages user profiles or user accounts for a plurality of users. Specifically, when a user registers with the network application 504 (e.g., via the client application), the network application 504 creates a user account for the user. The user profile database 536 can store information about the user for maintaining and displaying in a visible user profile for the user. For example, the user profile database 536 can maintain personal information, identification information, location information, images uploaded by the user, contacts, and other information that the user provides to the network application to populate the user profile. The user profile database 536 can also communicate with the communication manager 530 to send images of users to the merchant client device in connection with determining the identity of a user.

The network application 504 includes a face analyzer 538 that performs facial recognition processes on images of users. In particular, the face analyzer 538 compares images of users to determine whether a user in a first image appears in another image. For example, when the network application 504 receives a captured image of a user, the face analyzer communicates with the user profile database 536 to obtain an image associated with at least one user account for a user. The face analyzer 538 then compares the images to determine whether the user from the captured image appears in the image obtained from the user account. If the face analyzer 538 finds a match, the network application 504 can determine the identity of the user based on the corresponding user account.

In additional embodiments, the face analyzer 538 can use information provided by camera devices to allow the network application 504 to anticipate a purchase by the user. For example, if the user frequently purchases a product (e.g., coffee) from a specific chain of restaurants, the network application 540 can determine that the user would like to purchase the product even before the user arrives at the checkout location or at the store. To illustrate, the network application 540 can identify the user in an image captured by a first image capture device (e.g., at an ordering window or at a location within a specific distance of the checkout location) to determine that the user is likely going to purchase a product. The network application 540 can use the information from the face analyzer 538 and location information obtained by the communication manager 530 to generate and send a notification to the user inquiring if the user client device 104a would like to purchase the product. Based on the user's response, or automatically without sending a notification to the user client device 104a, the network application 540 can generate and send a notification to the merchant client device 104b to initiate a payment transaction for a purchase order in anticipation of the user's arrival.

Additionally, the face analyzer 538 can capture facial expressions to determine a mood of the user. For example, the face analyzer 538 can identify a mood of the user according to the determined facial expression of the user, such as by comparing the facial expression of the user in a captured image to one or more other images of the user and/or by using mood recognition techniques. Based on the identified mood of the user, the network application 504 can modify a typical order of the user or initiate another trigger (e.g., provide a message with the order). For example, if the user is in a bad mood, the network application 504 can modify a purchase order to provide an additional item (e.g., add cream to the user's coffee, increase the size, provide a discount) based on a learned pattern of the user's purchases when the user is in a bad mood.

Additionally, the network application 504 can include a message in a notification associated with the purchase order, or with the purchase order itself, based on the identified mood. To illustrate, if the face analyzer 538 determines that the user is in a bad mood, the network application 504 can send a notification to the user client device 104a to attempt to improve the mood of the user (e.g., a message such as "Cheer up!" or a joke). Alternatively, the network application 504 can send a request to the merchant via the merchant client device 104b to provide a message to the user when the user picks up the ordered goods.

Additionally, the network application 504 includes a risk calculator 540 to determine a risk associated with a user for a payment transaction. Specifically, the risk calculator 540 can determine whether the user is high risk based on information associated with the user in order to prevent fraudulent payment transactions. For example, the risk calculator 540 can determine the likelihood of fraudulent activity based on activity or information associated with the user in connection with the network application. Determining a risk associated with users involved in payment transactions can also be useful in determining whether to process a particular payment transaction or in determining how to treat the payment transaction. For example, the network application 504 and/or the payment engine 506 can use a calculated risk for a user to determine whether to process an electronic payment transaction between the user and the merchant or to require the user to pay via other methods (e.g., a physical debit card, cash, or check).

In one or more embodiments, the risk calculator 540 can access a transaction history for the user to identify tendencies of the user. For example, the risk calculator 540 can determine that the user typically visits a merchant on the same day every week, purchases the same goods or services at a merchant, or is involved in other payment transactions on a regular basis. The risk calculator 540 can then assess a risk for the user for a particular payment transaction based on the user's purchasing habits. Based on the determined risk, the risk calculator 540 can determine how to request authorization or whether to request authorization from the user for a given payment transaction.

To illustrate, if the user buys a cup of coffee from a merchant every day at approximately the same time, the risk calculator 540 can determine that the risk for a give payment transaction is low. The payment system 100 can then determine how to authorize a payment transaction based on the low risk. For example, the payment system 100 can waive an authorization request from the user for processing a payment transaction based on a low risk for the given payment transaction. Alternatively, the payment system 100 can authorize the payment transaction based on a verification of the user's identity from the merchant.

According to one or more embodiments, the payment system 100 can maintain the payment engine 506 separate from the network application 504. For example, the payment system 100 can implement payment processes associated with the payment engine 506 separately from at least some of the functionality of the network application 504 (e.g., using a messaging database for recovery). To illustrate, the payment system 100 can implement the functionality of the payment engine 506 on a first group of one or more servers and the functionality of the network application 504 on a second group of one or more servers. Implementing functionality of the payment engine 506 and the network application 504 on separate servers can allow the payment system 100 to ensure that at least some of the financial information associated with the users is maintained apart from the network application to comply with Payment Card Industry (PCI) standards. Alternative configurations of servers and/or software than those described herein may also allow the payment system 100 to comply with PCI standards.

As mentioned previously, the server device(s) 106 can include a payment engine 506 having a payment manager 542. The payment manager 542 can integrate the sending and receiving of payment requests and initiate payment transactions, and may employ one or more application programming interfaces (APIs). For example, upon the communication manager 530 receiving a payment request, the communication manager 530 can send any payment details to the payment manager 542. The payment manager 542 can then use the payment details retrieved from the payment request to initiate a payment transaction using the payment network 110.

The payment manager 542 can coordinate a transaction corresponding to a payment defined in a payment request. As generally explained above, the payment manager 542 can coordinate a transaction via the payment network that corresponds to a payment request, monitor the status of the transaction, and provide status information regarding the transaction. More specifically, the payment network 110 can authorize a transaction, fund a transaction, and/or settle an individual transaction or batch of transactions. In one or more embodiments, the payment manager 542 can use one or more application programming interfaces (API) to communicate relevant information with the payment network 110.

To complete a transaction, the payment manager 542 can access or obtain payment credentials for the consumer and the merchant. Specifically, the payment manager 542 identifies a payment credential (e.g., a payment authorization number or a payment token) for the user in connection with a payment account for the user. For example, the payment manager can communicate with the user profile database 536 to identify a payment account associated with a user account for the user. Additionally, the payment manager 542 can communicate with the communication manager 530 to send a plurality of possible payment accounts to the merchant client device 104b for selecting one of the possible payment accounts to use in the payment transaction.

The transaction database 544 of FIG. 5 can provide storage for a transaction history for users and merchants. For example, the transaction database 544 can store each transaction (such as in the form of a graph object), attempted or completed, transaction IDs, a date, an amount of the transaction, the payment method used, a user identifier, a merchant identifier, and any other information gathered on the transaction. With this information, the payment manager 542 can provide, upon request, a summary of one or more transactions to users as a history of payments requested, payments declined and payments completed.

Additionally, the payment engine 506 includes an account manager 546 for managing payment credentials of users and merchants in connection with payment accounts of the users/merchants. Specifically, a user or merchant can register a payment account or a payment receipt with the account manager 546. The account manager 546 can store the details about the payment accounts of the users and merchants who have user accounts in the user profile database 536. The account manager 546 can also store linking information that links the payment accounts to the respective user accounts. In one or more embodiments, the account manager 546 also stores additional information associated with the payment credentials, such as expiration dates, security codes, address information, and/or other information.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 6 illustrates a block diagram of exemplary computing device 600 that may be configured to perform one or more of the processes described above. One will appreciate that one or more computing devices such as the computing device 600 may implement the payment system 100. As shown by FIG. 6, the computing device 600 can comprise a processor 602, a memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from computing device 600. The I/O interface 608 may include a mouse, a keypad or a keyboard, a touchscreen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the payment system 100 can comprise a social-networking system. A social-networking system may enable its users (such as persons or organizations) to interact with the system and with each other. As mentioned above, the payment system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 7:
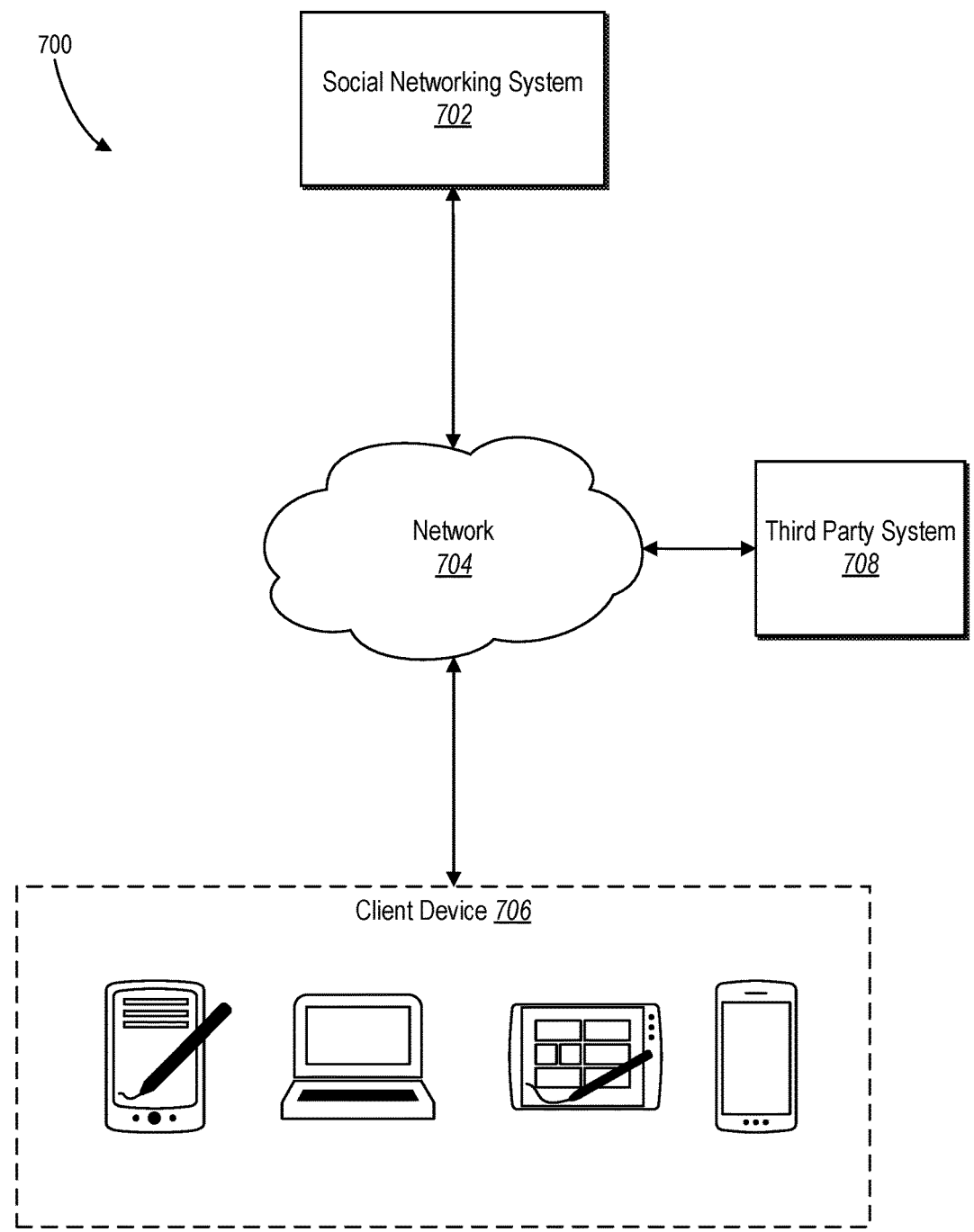
FIG. 7 illustrates an example network environment of a social-networking system in accordance with one or more embodiments.

FIG. 7 illustrates an example network environment 700 of a social-networking system. Network environment 700 includes a client system 706, a social-networking system 702, and a third-party system 708 connected to each other by a network 704. Although FIG. 7 illustrates a particular arrangement of client system 706, social-networking system 702, third-party system 708, and network 704, this disclosure contemplates any suitable arrangement of client system 706, social-networking system 702, third-party system 708, and network 704. As an example and not by way of limitation, two or more of client system 706, social-networking system 702, and third-party system 708 may be connected to each other directly, bypassing network 704. As another example, two or more of client system 706, social-networking system 702, and third-party system 708 may be physically or logically co-located with each other in whole or in part. Moreover, although FIG. 7 illustrates a particular number of client systems 706, social-networking systems 702, third-party systems 708, and networks 704, this disclosure contemplates any suitable number of client systems 706, social-networking systems 702, third-party systems 708, and networks 704. As an example and not by way of limitation, network environment 700 may include multiple client system 706, social-networking systems 702, third-party systems 708, and networks 704.

This disclosure contemplates any suitable network 704. As an example and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706, social-networking system 702, and third-party system 708 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example and not by way of limitation, a client system 706 may include any of the computing devices discussed above in relation to FIG. 7. A client system 706 may enable a network user at client system 706 to access network 704. A client system 706 may enable its user to communicate with other users at other client systems 706.

In particular embodiments, client system 706 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server, or a server associated with a third-party system 708), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 702 may be a network-addressable computing system that can host an online social network. Social-networking system 702 may generate, store, receive, and send social-networking data, such as, for example, user-profile data, concept-profile data, social-graph information, or other suitable data related to the online social network. Social-networking system 702 may be accessed by the other components of network environment 700 either directly or via network 704. In particular embodiments, social-networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706, a social-networking system 702, or a third-party system 708 to manage, retrieve, modify, add, or delete, the information stored in data store.

In particular embodiments, social-networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 702 may provide users of the online social network the ability to communicate and interact with other users. In particular embodiments, users may join the online social network via social-networking system 702 and then add connections (e.g., relationships) to a number of other users of social-networking system 702 whom they want to be connected to. Herein, the term "friend" may refer to any other user of social-networking system 702 with whom a user has formed a connection, association, or relationship via social-networking system 702.

In particular embodiments, social-networking system 702 may provide users with the ability to take actions on various types of items or objects, supported by social-networking system 702. As an example and not by way of limitation, the items and objects may include groups or social networks to which users of social-networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 702 or by an external system of third-party system 708, which is separate from social-networking system 702 and coupled to social-networking system 702 via a network 704.

In particular embodiments, social-networking system 702 may be capable of linking a variety of entities. As an example and not by way of limitation, social-networking system 702 may enable users to interact with each other as well as receive content from third-party systems 708 or other entities, or to allow users to interact with these entities through an application programming interfaces (API) or other communication channels.

In particular embodiments, a third-party system 708 may include one or more types of servers, one or more data stores, one or more interfaces, including but not limited to APIs, one or more web services, one or more content sources, one or more networks, or any other suitable components, e.g., that servers may communicate with. A third-party system 708 may be operated by a different entity from an entity operating social-networking system 702. In particular embodiments, however, social-networking system 702 and third-party systems 708 may operate in conjunction with each other to provide social-networking services to users of social-networking system 702 or third-party systems 708. In this sense, social-networking system 702 may provide a platform, or backbone, which other systems, such as third-party systems 708, may use to provide social-networking services and functionality to users across the Internet.

In particular embodiments, a third-party system 708 may include a third-party content object provider. A third-party content object provider may include one or more sources of content objects, which may be communicated to a client system 706. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 702 also includes user-generated content objects, which may enhance a user's interactions with social-networking system 702. User-generated content may include anything a user can add, upload, send, or "post" to social-networking system 702. As an example and not by way of limitation, a user communicates posts to social-networking system 702 from a client system 706. Posts may include data such as status updates or other textual data, location information, photos, videos, links, music or other similar data or media. Content may also be added to social-networking system 702 by a third-party through a "communication channel," such as a newsfeed or stream.

In particular embodiments, social-networking system 702 may include a variety of servers, sub-systems, programs, modules, logs, and data stores. In particular embodiments, social-networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 702 may also include suitable components such as network interfaces, security mechanisms, load balancers, failover servers, management-and-network-operations consoles, other suitable components, or any suitable combination thereof. In particular embodiments, social-networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 702 to one or more client systems 706 or one or more third-party system 708 via network 704. The web server may include a mail server or other messaging functionality for receiving and routing messages between social-networking system 702 and one or more client systems 706. An API-request server may allow a third-party system 708 to access information from social-networking system 702 by calling one or more APIs. An action logger may be used to receive communications from a web server about a user's actions on or off social-networking system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of social-networking system 702. A privacy setting of a user determines how particular information associated with a user can be shared. The authorization server may allow users to opt in to or opt out of having their actions logged by social-networking system 702 or shared with other systems (e.g., third-party system 708), such as, for example, by setting appropriate privacy settings. Third-party-content-object stores may be used to store content objects received from third parties, such as a third-party system 708. Location stores may be used for storing location information received from client systems 706 associated with users. Advertisement-pricing modules may combine social information, the current time, location information, or other suitable information to provide relevant advertisements, in the form of notifications, to a user.

Figure 8:
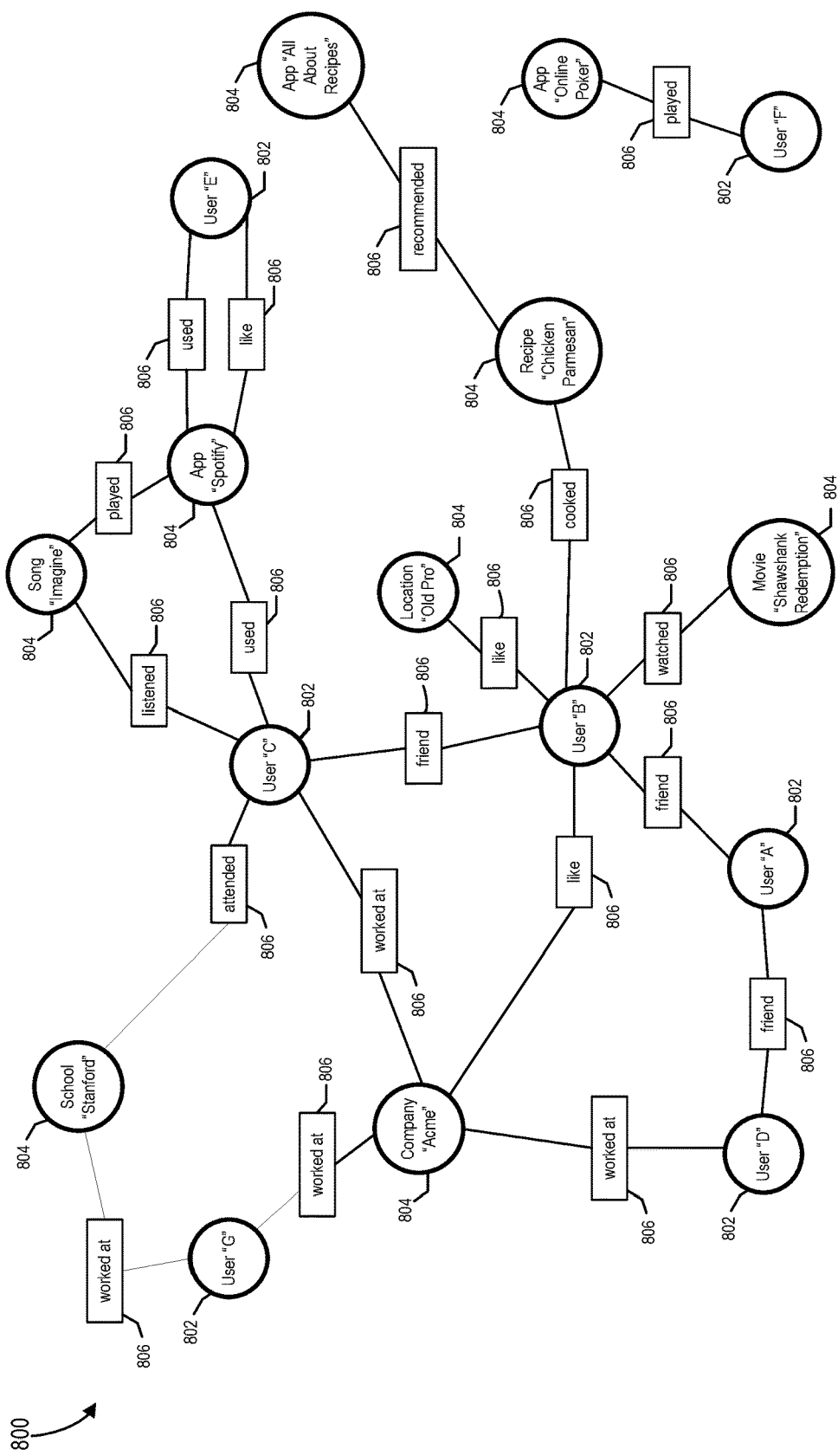
FIG. 8 illustrates an example social graph for a social-networking system in accordance with one or more embodiments.

FIG. 8 illustrates example social graph 800. In particular embodiments, social-networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social-networking system 702, client system 706, or third-party system 708 may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social-networking system 702. As an example and not by way of limitation, a user may be an individual (human user), an entity (e.g., an enterprise, business, or third-party application), or a group (e.g., of individuals or entities) that interacts or communicates with or over social-networking system 702. In particular embodiments, when a user registers for an account with social-networking system 702, social-networking system 702 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 702. In particular embodiments, a user node 802 may be associated with information provided by a user or information gathered by various systems, including social-networking system 702. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social-networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social-networking system 702. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 702. Profile pages may also be hosted on third-party websites associated with a third-party server 708. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 708. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social-networking system 702 a message indicating the user's action. In response to the message, social-networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 702 may send a "friend request" to the second user. If the second user confirms the "friend request," social-networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to a edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to social-networking system 702 a message indicating the user's liking of the concept associated with the concept-profile page. In response to the message, social-networking system 702 may create an edge 806 between user node 802 associated with the user and concept node 804, as illustrated by "like" edge 806 between the user and concept node 804. In particular embodiments, social-networking system 702 may store an edge 806 in one or more data stores. In particular embodiments, an edge 806 may be automatically formed by social-networking system 702 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 702 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 702) or RSVP (e.g., through social-networking system 702) to an event associated with the advertisement. In addition or as an alternative, an advertisement may include social-networking-system context directed to the user. As an example and not by way of limitation, an advertisement may display information about a friend of the user within social-networking system 702 who has taken an action associated with the subject matter of the advertisement.

In particular embodiments, social-networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 708 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 702 may calculate a coefficient based on a user's actions. Social-networking system 702 may monitor such actions on the online social network, on a third-party system 708, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 702 may calculate a coefficient based on the user's actions with particular types of content. The content may be associated with the online social network, a third-party system 708, or another suitable system. The content may include users, profile pages, posts, news stories, headlines, instant messages, chat room conversations, emails, advertisements, pictures, video, music, other suitable objects, or any combination thereof. Social-networking system 702 may analyze a user's actions to determine whether one or more of the actions indicate an affinity for subject matter, content, other users, and so forth. As an example and not by way of limitation, if a user may make frequently posts content related to "coffee" or variants thereof, social-networking system 702 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 702 may calculate a coefficient based on the type of relationship between particular objects. Referencing the social graph 800, social-networking system 702 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 702 may determine that the user has a higher coefficient with respect to the first photo than the second photo because having a tagged-in-type relationship with content may be assigned a higher weight and/or rating than having a like-type relationship with content. In particular embodiments, social-networking system 702 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example and not by way of limitation, if a user is one mile from an airport and two miles from a gas station, social-networking system 702 may determine that the user has a higher coefficient for the airport than the gas station based on the proximity of the airport to the user.

In particular embodiments, social-networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 702 may provide information that is relevant to user's interests and current circumstances, increasing the likelihood that they will find such information of interest. In particular embodiments, social-networking system 702 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 702 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 708 (e.g., via an API or other communication channel), or from another suitable system. In response to the request, social-networking system 702 may calculate the coefficient (or access the coefficient information if it has previously been calculated and stored). In particular embodiments, social-networking system 702 may measure an affinity with respect to a particular process. Different processes (both internal and external to the online social network) may request a coefficient for a particular object or set of objects. Social-networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social-networking system 702 or shared with other systems (e.g., third-party system 708). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 708, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method, comprising:
    receiving, by at least one server from a merchant client device, a payment request to initiate an in-store payment transaction between a user and a merchant, wherein the payment request comprises an image of the user;
    identifying, by the at least one server, a plurality of users at a location of the merchant based on location data corresponding to a user device associated with each of the plurality of users;
    accessing, by the at least one server in response to identifying the plurality of users at the location of the merchant, a plurality of social networking accounts for the plurality of users to obtain a plurality of images corresponding to the plurality of users;

comparing, by the at least one server, the image of the user from the payment request to the plurality of images corresponding to the plurality of users to determine a social networking account associated with the user;

obtaining, by the at least one server and from the social networking account associated with the user, a payment account for the user;

sending a payment confirmation request to a client device associated with the payment account for the user, the payment confirmation request corresponding to the payment request to initiate the in-store payment transaction;

receiving a confirmation response from the client device to process the in-store payment transaction; and processing, using the payment account for the user, the in-store payment transaction based on the received confirmation response.

2. The method as recited in claim 1, further comprising:
determining that the image includes a plurality of users within a field of view of an image capture device; and
identifying each user of the plurality of users from the image of the plurality of users based on the plurality of images from the plurality of social networking accounts.

3. The method as recited in claim 2, wherein sending the plurality of images corresponding to the plurality of users to the merchant client device comprises:
determining that the image of the user in the payment request comprises a plurality of users;
sending a plurality of images corresponding to the plurality of users to the merchant client device; and
receiving, from the merchant client device, a selection by the merchant of an image of the user from the plurality of users.

4. The method as recited in claim 3, wherein sending the plurality of images corresponding to the plurality of users to the merchant client device comprises causing the merchant client device to display the plurality of images in a purchase order interface associated with the in-store payment transaction.

5. The method as recited in claim 3, wherein sending the payment confirmation request to the client device associated with the payment account for the user comprises:
sending the payment confirmation request to a client device associated with the social networking account associated with the user corresponding to the image selected by the merchant.

6. The method as recited in claim 3, wherein sending the plurality of images corresponding to the plurality of users to the merchant client device comprises:
identifying, for a user of the plurality of users, a plurality of images from the social networking account associated with the user;
ranking the plurality of images based on a plurality of characteristics of the plurality of images from the social networking account associated with the user; and
selecting a highest ranked image from the plurality of images associated with the user account for comparing to the image of the user from the payment request to determine an identity of the user.

7. The method as recited in claim 3, wherein sending the plurality of images corresponding to the plurality of users to the merchant client device comprises:
identifying, for a candidate user of the plurality of users and from a social networking account of the candidate user, an image comprising a plurality of faces of people other than the candidate user;

cropping the image comprising the plurality of faces of people other than the candidate user; and
sending the cropped image to the merchant client device.

8. The method as recited in claim 1, wherein identifying the payment account for the user comprises:
identifying a plurality of payment accounts from the social networking account associated with the user;
sending, to the merchant client device, a plurality of indicators associated with the plurality of payment accounts; and
receiving, from the merchant client device, a selected indicator from the plurality of indicators associated with the plurality of payment accounts.

9. The method as recited in claim 1, wherein sending the payment confirmation request to the client device associated with the payment account for the user comprises sending a push notification comprising payment data associated with the in-store payment transaction.

10. A system, comprising:
at least one processor; and
a non-transitory computer readable storage medium comprising instructions that, when executed by the at least one processor, cause the system to:
receive, from a merchant client device, a payment request to initiate an in-store payment transaction between a user and a merchant, wherein the payment request comprises an image of the user;
identify a plurality of users at a location of the merchant based on location data corresponding to a user device associated with each of the plurality of users;
access, in response to identifying the plurality of users at the location of the merchant, a plurality of social networking accounts for the plurality of users to obtain a plurality of images corresponding to the plurality of users;
compare the image of the user from the payment request to the plurality of images corresponding to the plurality of users to determine a social networking account associated with the user;
obtain, from the determined social networking account associated with the user, a payment account for the user;
send a payment confirmation request to a client device associated with the payment account for the user, the payment confirmation request corresponding to the payment request to initiate the in-store payment transaction;
receive a confirmation response from the client device to process the in-store payment transaction; and
process, using the payment account for the user, the in-store payment transaction based on the received confirmation response.

11. The system as recited in claim 10, wherein the instructions that cause the system to send the plurality of images corresponding to the plurality of users to the merchant client device cause the system to:
determine that the image of the user in the payment request comprises a plurality of users;
send a plurality of images corresponding to the plurality of users to the merchant client device; and
receive, from the merchant client device, a selection by the merchant of an image of the user from the plurality of users.

12. The system as recited in claim 11, wherein the instructions that cause the system to send the plurality of images corresponding to the plurality of users to the merchant client device cause the system to display the plurality of images in a purchase order interface associated with the in-store payment transaction.

13. The system as recited in claim 10, wherein the instructions that cause the system to send the payment confirmation request to the client device associated with the payment account for the user cause the system to:
send the payment confirmation request to a client device associated with the social networking account associated with the user.

14. The system as recited in claim 13, further comprising instructions that, when executed by the at least one processor, cause the system to identify the payment account for the user by:
identifying a plurality of payment accounts from the social networking account associated with the user;
sending, to the merchant client device, a plurality of payment tokens associated with the plurality of payment accounts; and
receiving, from the merchant client device, a selected payment token from the plurality of payment tokens associated with the plurality of payment accounts.

15. The system as recited in claim 13, further comprising instructions that, when executed by the at least one processor, cause the system to send the payment confirmation request to the client device associated with the payment account for the user by sending a push notification comprising payment data associated with the in-store-payment transaction.

16. A non-transitory computer readable storage medium comprising instructions that, when executed by at least one processor, cause a computer system to:
receive, from a merchant client device, a payment request to initiate an in-store payment transaction between a user and a merchant, wherein the payment request comprises an image of the user;
identify a plurality of users at a location of the merchant based on location data corresponding to a user device associated with each of the plurality of users;
access, in response to identifying the plurality of users at the location of the merchant, a plurality of social networking accounts for the plurality of users to obtain a plurality of images corresponding to the plurality of users;
compare the image of the user from the payment request to the plurality of images corresponding to the plurality of users to determine a social networking account associated with the user;
obtain, from the determined social networking account associated with the user, a payment account for the user;
send a payment confirmation request to a client device associated with the payment account for the user, the payment confirmation request corresponding to the payment request to initiate the in-store payment transaction;
receive a confirmation response from the client device to process the in-store payment transaction; and
process, using the payment account for the user, the in-store payment transaction based on the received confirmation response.

17. The non-transitory computer readable storage medium as recited in claim 16, wherein the instructions that cause the computer system to send the plurality of images corresponding to the plurality of users to the merchant client device cause the computer system to:
determine that the image of the user in the payment request comprises a plurality of users;
send a plurality of images corresponding to the plurality of users to the merchant client device; and
receive, from the merchant client device, a selection by the merchant of an image of the user from the plurality of users.

18. The non-transitory computer readable storage medium as recited in claim 17, wherein the instructions that cause the computer system to send the plurality of images corresponding to the plurality of users to the merchant client device cause the computer system to display the plurality of images in a purchase order interface associated with the in-store payment transaction.

19. The non-transitory computer readable storage medium as recited in claim 16, the instructions that cause the computer system to send the payment confirmation request to the client device associated with the payment account for the user cause the computer system to:
send the payment confirmation request to a client device from the social networking account associated with the user.

20. The non-transitory computer readable storage medium as recited in claim 19, further comprising instructions that, when executed by the at least one processor, cause the computer system to identify the payment account for the user based on the image of the user by:
identifying a plurality of payment accounts from the social networking account associated with the user;
sending, to the merchant client device, a plurality of payment tokens associated with the plurality of payment accounts; and
receiving, from the merchant client device, a selected payment token from the plurality of payment tokens associated with the plurality of payment accounts.

* * * * *